United States Patent
Ito et al.

(10) Patent No.: US 8,189,962 B2
(45) Date of Patent: May 29, 2012

(54) IMAGE PROCESSING APPARATUS

(75) Inventors: Wataru Ito, Kodaira (JP); Mitsue Ito, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 989 days.

(21) Appl. No.: 11/957,533

(22) Filed: Dec. 17, 2007

(65) Prior Publication Data

US 2008/0166017 A1    Jul. 10, 2008

(30) Foreign Application Priority Data

Dec. 19, 2006 (JP) .................. 2006-341438
Nov. 1, 2007   (JP) .................. 2007-284719

(51) Int. Cl.
G06K 9/00     (2006.01)
G06K 9/36     (2006.01)
G06K 9/32     (2006.01)
H04N 5/225    (2006.01)
G09G 5/00     (2006.01)

(52) U.S. Cl. ........ 382/293; 382/103; 382/276; 348/169; 345/619

(58) Field of Classification Search .................. None
See application file for complete search history.

(56) References Cited

U.S. PATENT DOCUMENTS

| | | | | |
|---|---|---|---|---|
| 5,157,315 A * | 10/1992 | Miyake et al. | ........... | 318/568.11 |
| 5,307,070 A * | 4/1994 | Runge et al. | ................ | 342/25 D |
| 5,528,194 A * | 6/1996 | Ohtani et al. | ................ | 382/293 |
| 5,754,688 A * | 5/1998 | Gatlin et al. | ................... | 382/193 |
| 5,809,161 A * | 9/1998 | Auty et al. | ..................... | 382/104 |
| 5,995,663 A * | 11/1999 | Itsuzaki et al. | ................ | 382/203 |
| 6,812,835 B2 * | 11/2004 | Ito et al. | ......................... | 340/541 |
| 7,205,529 B2 * | 4/2007 | Andersen et al. | ......... | 250/223 R |
| 7,738,008 B1 * | 6/2010 | Ball | ............... | 348/159 |
| 7,848,903 B2 * | 12/2010 | Aratani et al. | ................ | 702/150 |
| 7,894,528 B2 * | 2/2011 | Rav-Acha | ................ | 375/240.16 |
| 2002/0033818 A1 * | 3/2002 | Lin | ................ | 345/419 |
| 2003/0180039 A1 * | 9/2003 | Kakou et al. | ................. | 396/427 |
| 2004/0131248 A1 * | 7/2004 | Ito et al. | ........................ | 382/154 |
| 2006/0056056 A1 * | 3/2006 | Ahiska et al. | ................ | 359/690 |
| 2006/0056654 A1 * | 3/2006 | Yoda et al. | .................... | 382/103 |
| 2006/0152584 A1 * | 7/2006 | Wang et al. | ................... | 348/143 |
| 2009/0148019 A1 * | 6/2009 | Hamada et al. | ............... | 382/131 |

FOREIGN PATENT DOCUMENTS

| | | | |
|---|---|---|---|
| JP | 07-037063 | | 2/1995 |
| JP | 2001-273500 | | 10/2001 |
| JP | 2003346132 A | * | 12/2003 |
| JP | 2005-057743 | | 3/2005 |
| JP | 2005311666 A | * | 11/2005 |
| JP | 2006-211696 | | 8/2006 |

* cited by examiner

*Primary Examiner* — Michelle Entezari
(74) *Attorney, Agent, or Firm* — Brundidge & Stanger, P.C.

(57) ABSTRACT

In an image processing apparatus for processing images, a transformation unit transforms an image on a first coordinate system representing a coordinate system during pickup to an image on a second coordinate system set up on a reference plane, a display unit displays an image transformed by the transformation unit and a reception unit receives setting information a user inputs in accordance with a displayed image on the display unit. For example, in the image processing apparatus, the reception unit receives, as the setting information, information to be used for image processing.

20 Claims, 12 Drawing Sheets

IMAGE PROCESSING APPARATUS

INCORPORATION BY REFERENCE

The present application claims priority from Japanese application JP 2006-341438 filed on Dec. 19, 2006 and JP 2007-284719 filed on Nov. 1, 2007, the contents of which are hereby incorporated by reference into this application.

BACKGROUND OF THE INVENTION

The present invention relates to image processing apparatus and more particularly, to an image processing apparatus which visually facilitates setting operation necessary for image processing by making use of the coordinate transformation.

A monitor apparatus has hitherto been used widely in which an input image representing an image of an area to be monitored that is picked up with an image pickup unit mounted with a solid imaging device such as a CCD (Charge Coupled Device) or CMOS (Complementary Metal-Oxide Semiconductor), for example, is processed by means of an image processing unit to automatically detect a given object transcribed in the input image. As an example of the method for automatic detection of an object (body) in an input image, a method called a difference method (background difference method) has been used.

In an object detection method based on the background difference method, the difference in brightness (or pixel value) between an input image obtained from the image pickup unit and a background image (reference image) picked up under disappearance of an object to be detected is calculated, the thus obtained difference image is binarized at predetermined thresholds to provide a digital image and then the supervision is waged on the presumption that the object to be detected will possibly exist in an area in which the size thereof reaches a predetermined size in the binarized image (change area).

The background difference method is diagrammatically illustrated in FIG. 7.

An input image 51 contains an image 52 of a human figure. On the other hand, a background image 53 is prepared in advance. A difference between input image 51 and background image 53 is calculated in respect of individual pixels by means of a difference calculator 54 to consequently obtain a difference image 55. In the difference image 55, the human figure image 52 transcribed in the input image 51 is detected as a pixel group 56 created by the difference.

Next, values of individual pixels of difference image 55 are compared with a threshold value (for example, 20 for one pixel supposed to be of 8 bits) by means of a binary digitization unit 57 so that pixels exceeding the threshold value may be converted to "255" and pixels less than the threshold may be converted to "0". Through the process as above, a binarized image 58 can be obtained. In the binarized image, the area 56 producing the difference in the difference image 55 is detected as a binarized pixel group 59. It should be understood that the pixel group representing an ideal human figure is detected in FIG. 7 but sometimes, an object which is an originally single object will be detected in the form of a plurality of pixel groups or originally plural objects will be detected in the form of a single pixel group.

Further, by way of a grouping or labeling process in which lumps of binarized pixel 59 are subjected to grouping (by consulting the position and size of the previously detected lump) and the same number is assigned to the same object as the preceding one, the object detection can be accomplished. The result of detection can be obtained as an image in which the object is marked by a rectangular frame having predetermined width and height such as area 60 or by numerical values indicative of the position and size (height and width) of the object.

In addition to the background difference, various kinds of detection methods have been known including an inter-frame difference method and an optical flow method.

Incidentally, in an unattended monitor system, an object detected from a picked-up image through the aforementioned method is confirmed, with a view to reducing erroneous information, as to whether to be a true object to be detected by comparing information representing a reference (reference information) with information of the object extracted from the input image to make a decision (judgment), for example. The reference information (parameters) includes, for example, information concerning the position and size of the object to be detected.

More particularly, a parameter for deciding a target object as to which area in a picked-up input image the target object exists in is set in advance and it is then decided whether the position of the target object (for example, a ground position) is present inside the area. The parameter for settling the area is called an area parameter. In addition, in conformity with the size of an object to be detected (for example, a person), the range of size of the object to be detected is designated. This range is called a size parameter.

For example, in setting the area parameter, an input image is displayed on a display unit and apices of a polygon are set on the display screen by using an operation unit such as a mouse, thereby designating a desired area.

An example of an input image 71 is illustrated in FIG. 9.

For example, when an object approaching a building 72 in the input image 71 is to be detected, an area of a polygon 73 (dotted portion in the figure), for instance, is designated in the input image 71 as illustrated by using a predetermined designation unit.

Then, by deciding whether an object having a size meeting a size parameter is detected within the designated polygon through, for example, the difference method, a particular object approaching the building 72 (intruder or the like) can be detected.

Object detection techniques are disclosed in JP-A-2006-211696 corresponding to U.S. Pat. No. 6,812,835, JP-A-2005-57743 corresponding to U.S. Patent Application Publication No. 2005/0018879, JP-A-2001-273500 and JP-A-7-37063.

SUMMARY OF THE INVENTION

In the method for setting in the monitor apparatus as shown in FIG. 9, however, even objects (buildings, intruders and the like) of the same size are differently sized in the input image depending on the distance from a camera (image pickup unit). Accordingly, in an image of display unit which displays an input image as it is, a location remote from the camera is displayed in a smaller size, giving rise to a problem that accurate setting of a desired area such as a polygon 73 at a remote location through the operation based on the mouse is difficult to achieve. For example, when it is desired that an object approaching the interior of an area distant from a specified building by some meters be detected, accurate designation of the distance between the building and the area on the screen is difficult to achieve in accordance with the distance from the camera.

Further, the size parameter will possibly change in an image. Accordingly, a method is employed according to which sizes on an image of an object to be detected are designated at two positions on the image and a size on the image of an object existing at a different position is determined by interpolating the sizes at the designated two positions or alternatively, a method is adopted according to which an area is divided into a plural divisional areas and size parameters are set in respect of individual divisional areas.

In the former method, information on size at an arbitrary position on an image can in principle be interpolated if an accurate interpolation formula can be obtained but the manual, accurate creation of such an interpolation formula on the basis of only an input image is very difficult. In other words, the number of positions of objects to be designated on the image is increased for the purpose of reducing errors but a sufficient number of objects whose true sizes are known are not always transcribed in the image. Ideally, visiting a spot concerned to acquire information about the camera installation status is unneeded and setting can preferably be carried out from a remote location while watching an input image.

The latter method for area division is also disadvantageous in that a highly graded skill is required to acquire proper divisions free from irregular errors with the knowledge of true sizes in respective areas.

The present invention is made in the light of the aforementioned conventional drawbacks and has for its object to provide an image processing apparatus which can visually facilitate setting by a user in performing setting of parameters necessary for image processing.

To accomplish the above object, according to the present invention, an image processing apparatus for processing images is constructed as below.

More particularly, an image processing apparatus for processing images picked up by a camera to detect objects in the images comprises transformation means for transforming an image on a first coordinate system representing a coordinate system during pickup to an image on a second coordinate system set up on a plane representing a reference, display means for displaying the image transformed by means of the transformation means, reception means for receiving setting information inputted by a user in accordance with a display of the image by the display means and detection means for transforming picked-up image or/and parameters necessary for detection by using the received setting information and then detecting an object from the picked up image by using the parameters.

For the image on the first coordinate system and the image on the second coordinate system, mutual coordinate transformation is performed through central projection about the center at a principal point of the camera.

Accordingly, since an image is displayed on the second coordinate system on which, for example, the ground surface is transcribed as being kept to remain unchanged substantially in size irrespective of the distance and setting information is received from the user watching the image, visual setting by the user can be facilitated in, for example, setting of an area.

The image processing apparatus may further comprise image pickup means for picking up images or alternatively image pickup means may be provided externally of the image processing apparatus and an image picked up by the image pickup means may be inputted to the image processing apparatus.

Further, as in embodiment 3, the transformation means transforms an image on the first coordinate system representing a coordinate system during pickup also to an image on a third coordinate system different from the second coordinate system, the reception means receives setting information as a value on any of the first, second and third coordinate systems and the detection means detects an object by using, among the first to third coordinate systems, coordinate systems different for the size parameter and the area parameter.

The image processing signifies herein a process for detecting an object transcribed in an image, for example, but it may purpose to perform measurement or merely give a display to persons.

The first coordinate system representing a coordinate system during pickup is, for example, a coordinate system as viewed from image pickup means (for example, a camera) and is exemplified by a coordinate system on the pickup plane when an object to be picked up is projected centrally of a focal point on the pickup plane. The first coordinate system corresponds to a camera coordinate system (x-y coordinates) in embodiments.

The second coordinate system on which the size is transcribed as remaining unchanged substantially irrespective of the distance is exemplified by an orthonormal coordinate system (non-linear and non-orthogonal coordinate systems approximating it are also included) having two axes on a ground surface plane (earth plane) when the horizontal ground surface is defined as a reference plane. With information in the normal (height) direction neglected, the second coordinate system can be treated as a two-dimensional coordinate system resulting from orthogonally projecting the ground surface in the normal direction. The second coordinate system corresponds to a scene coordinate system ($\zeta$-$\psi$-Z), a map coordinate system (X-Y-Z) or a global coordinate system ($X_G$-$Y_G$-$Z_G$).

The second coordinate system is set in advance by, for example, the user and stored in a memory of the image processing apparatus. As the reference plane, a plan of the ground surface which is viewed from directly above, for example, may be used. But due to the fact that the ground surface is not completely flat and, in some case, the reference plane is not always required to exactly coincide with the ground surface, a difference of the degree which does not matter practically can be accepted.

In the image processing apparatus, for example, a transformation expression (mathematical expression) based on the disposition and focal distance of the installed image pickup unit (for example, a camera) is used to accomplish the mutual transformation between the first and second coordinate systems.

Information concerning the disposition and focal distance of the image pickup unit may be set in the image processing apparatus by the user or may be detected (automatically) by the image processing apparatus on the basis of information from the image pickup unit or alternatively, the image processing apparatus controls the disposition and focal distance of the image pickup unit and information concerning the disposition and focal distance of the image pickup unit as well, thus materialized through the control, may be used.

The reception means for receiving the information inputted by the user may be constructed by using an operation unit, for example, a mouse or keyboard operated by the user. The mode of receiving the information inputted by the user may include, for example, the mode of causing the user to operate the operation unit while watching an image on the second coordinate system displayed on the screen so as to input the information or the mode of displaying the information received from the user, such as the area size, length or numerical value, on the screen, thereby making it possible to promote the easy-to-handle capability for the convenience of the user.

The present invention can be offered in the form of a method, a program or a recording medium. In a method according to the invention, individual means in an apparatus or a system execute various processes. A program according to the invention is executed by a computer constituting the apparatus or system and various functions can be realized by means of the computer.

According to the image processing apparatus, an image is displayed on a coordinate system on a plane representing reference and the setting information is received from the user watching the displayed image, thereby ensuring that setting by the user can be facilitated visually.

Other objects, features and advantages of the invention will become apparent from the following description of the embodiments of the invention taken in conjunction with the accompanying drawings.

DESCRIPTION OF THE EMBODIMENTS

Embodiments according to the present invention will now be described with reference to the accompanying drawings.
Embodiment 1

Figure 1:
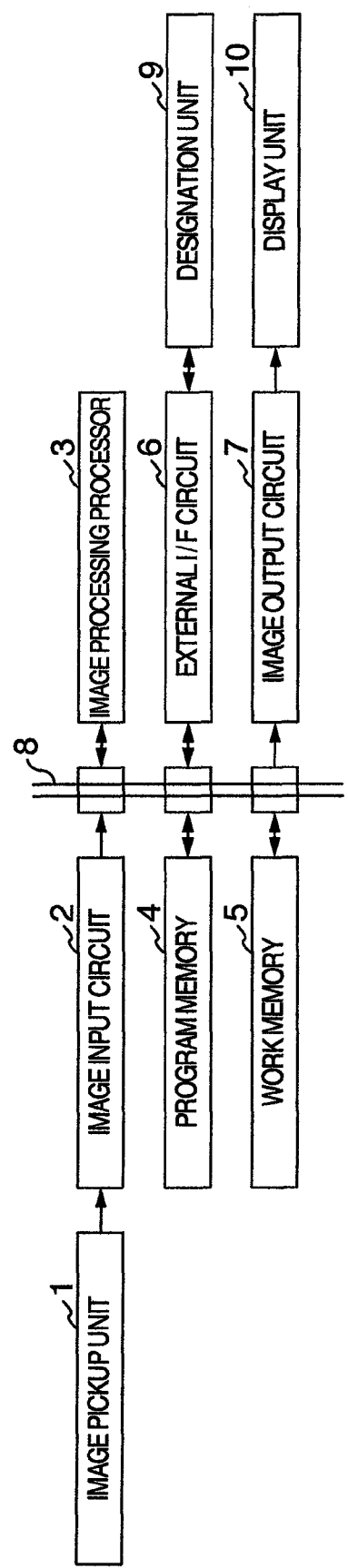
FIG. 1 is a block diagram showing an example of construction of a monitor apparatus according to embodiment 1 of the invention.

A monitor apparatus according to embodiment 1 of the present invention is constructed as exemplified in FIG. 1.

The exemplified monitor apparatus comprises an image pickup unit 1 constructed by using a camera, for example, an image input circuit 2, an image processing processor 3, a program memory 4, a work memory 5, an external I/F (interface) circuit 6, an image output circuit 7, a data bus 8, a designation unit 9 comprised of, for example, a mouse or a keyboard operated manually, and a display unit 10.

The image input circuit 2, image processing processor 3, program memory 4, work memory 5, external I/F circuit 6 and image output circuit 7 are coupled to the data bus 8.

The image pickup unit 1 used herein may include, for example, a unit for controlling the image pickup unit 1 and a unit for recording various external data.

An example of general operation performed in the monitor apparatus in embodiment 1 will be described.

Figure 2:
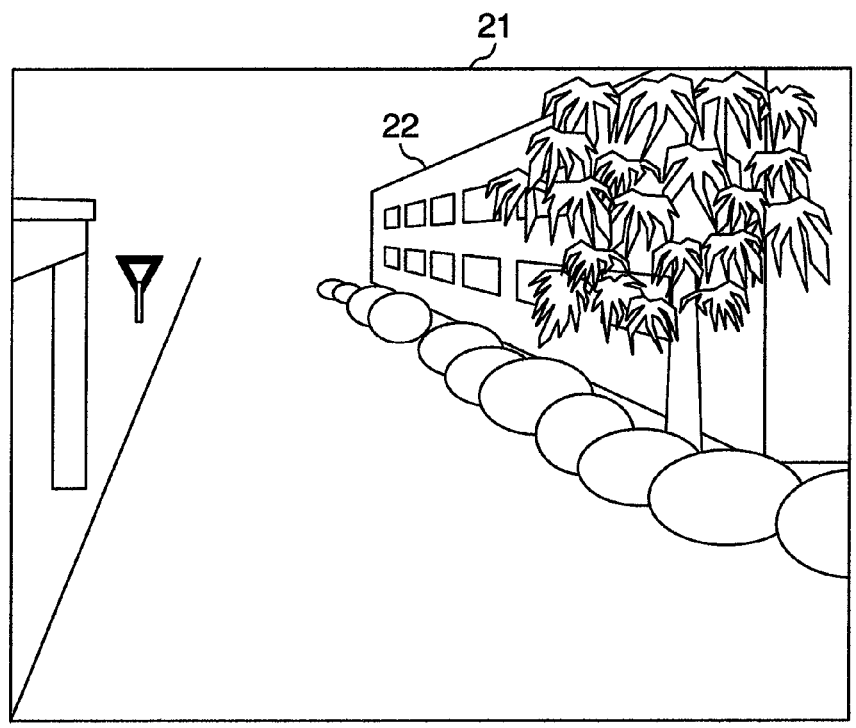
FIG. 2 is a pictorial view illustrating an example of an image (input image) picked up by an image pickup unit.

The image pickup unit 1 is, for example, a television camera for picking up an image (video) containing an area to be monitored (monitor target area) as shown in FIG. 2. As regards the image, images may be picked up at a predetermined rate and delivered to the image input circuit 2 or the latest image may be delivered each time that a request from the image input circuit 2 is received.

The work memory 5 acquires the image picked up by the image pickup unit 1 (input image 21 and background image T1 (to be described later)) through the image input circuit 2 and stores it. This memory also stores various parameters necessary for image processing, such as area parameter T2 and size parameter T3 (to be described later).

The image processing processor 3 follows a program recorded on the program memory 4 to process the input image recorded in the work memory 5 and transmits the result of processing through the image output circuit 7 to the display unit 10 to cause it to display the result on its screen.

A command from the operator (user) received by using the designation unit 9 is inputted through the external I/F circuit 6. On the basis of the inputted command, the image processing processor 3 changes or corrects the aforementioned parameters for the sake of processing the input image.

Figure 7:
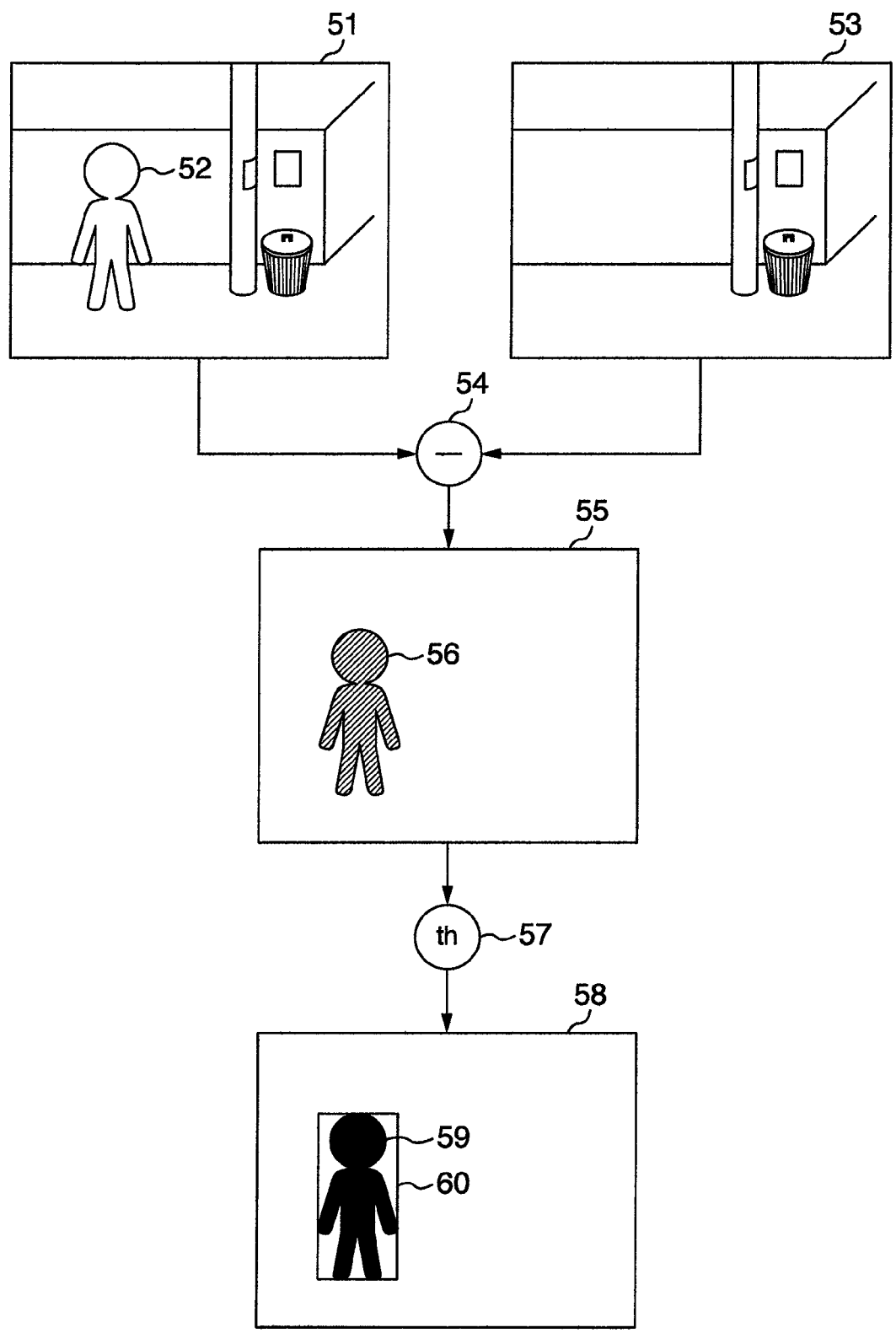
FIG. 7 is a diagram illustrating an example of status of fundamental process procedures in a difference method.
Figure 8:
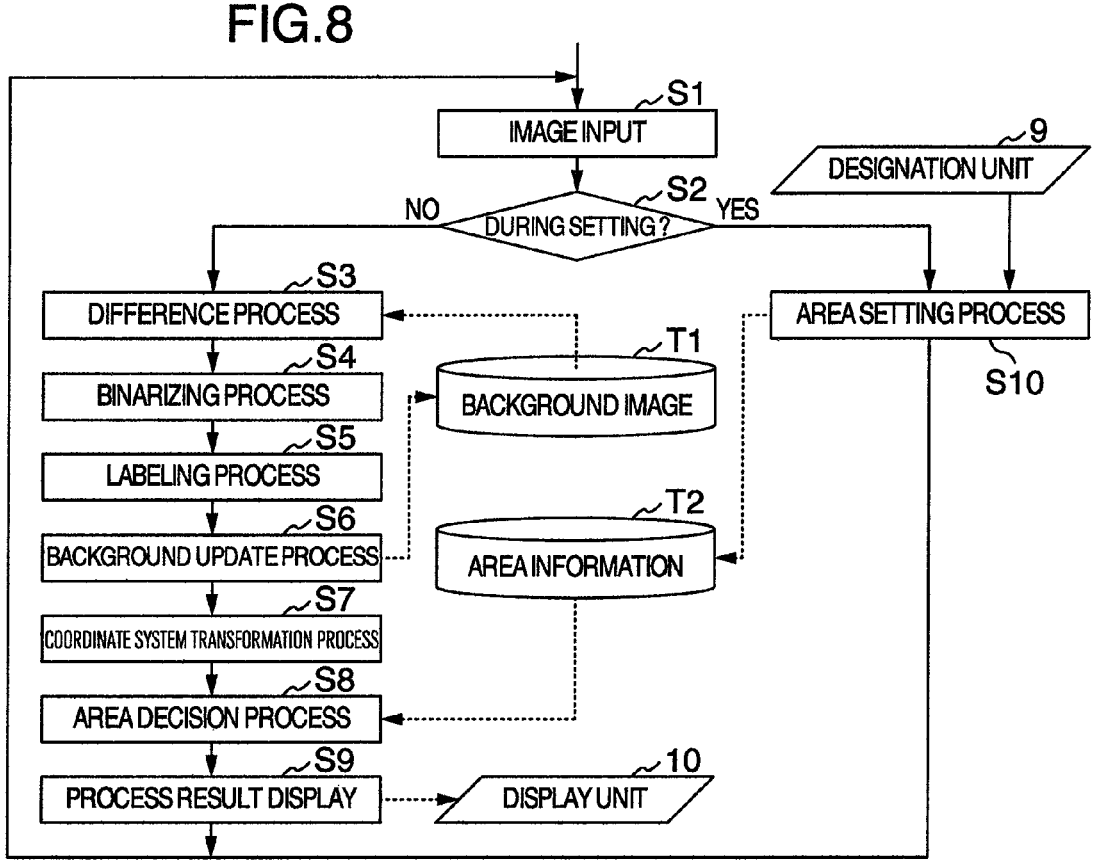
FIG. 8 is a flowchart showing an example of procedures in image processing.

Turning to FIG. 8, there is illustrated a flowchart showing procedures in an object detection process executed during steady operation by the image processing processor 3 in the present embodiment 1. In FIG. 8, for better understanding of explanation, the background image T1 (for example, corresponding to background image 53 depicted in FIG. 7) and area information T2 which are recorded on the work memory 5, designation unit 9 and display unit 10 are illustrated in addition to process steps S1 to S10. Dotted line arrow indicates flow of data.

In image input step (S1), an image picked up by the image pickup unit 1 is transferred to the work memory 5 through the image input circuit 2.

In setting decision step (S2), the program branches to setting process step (S10) when a setting command by the operator issued from the designation unit 9 is received through the external I/F circuit 6 but to difference process step (S3) in the absence of any setting command.

When the setting decision step (S2) determines no setting command from the designation unit 9, differences are calculated in the difference process step (S3) between the input image 21 inputted in the image input step (S1) and the background image T1 recorded in the work memory 5 in respect of individual pixels to obtain a difference image (for example, corresponding to the difference image 55 shown in FIG. 7).

In binary digitization process step (S4), values of the respective pixels in the difference image are compared with a predetermined threshold to perform such a transformation that pixels having their values being larger than the threshold are transformed to "255" and pixels having their values being less than the threshold are transformed to "0", thereby obtaining a binarized image (for example, corresponding to the binarized image 58 shown in FIG. 7).

In labeling process step (S5), lumps each comprised of "255" pixels in the binarized image are allotted with different numbers to ensure that they can be processed discriminately.

In background update process step (S5), the background image T1 recorded in the work memory 5 is updated using the input image 21 obtained in the image input step (S1). In updating the background image T1, a new background image T1 can be prepared using a method of, for example, time-averaging the individual pixels in the input image 21 (except the area in which the object is detected), so that the background image T1 can be kept to be in the latest condition by following changes in brightness due to, for example, changes in monitoring environment (weather).

In coordinate system transformation step (S7), the position, length (height) and width of each of the labeled lumps are transformed from those on the camera coordinate system to those on the map coordinate system by using coordinate transformation parameter T4. Presumably, since the object stands on ground at the lower end of a "225" pixel lump, the position of the lump is defined as the position of the lower end (or side). The map coordinate system is a (two-dimensional) coordinate system resulting from projecting the ground surface not obliquely but orthogonally in the normal direction and on the map coordinate, objects of the same size are displayed in the same size irrespective of locations. The coordinate transformation will be detailed later.

In area decision process step (S8), the area parameter T2 recorded in the work memory 5 is consulted and when a labeled lump having the length (height) and width which correspond to the size parameter T3 is present in an area 32 designated by, for example, the area parameter T2, the lump is determined as being an intrusion object. It is to be understood that the area parameter T2 and size parameter T3 have each values also expressed on the map coordinate system or the like.

In process result display step (S9), the decision result in the area decision process step (S7) is displayed on the screen of display unit 10.

When process result display step (S9) ends, the program returns to the image input step (S1) and each time that an image input is received (for example, at a period of frame rate of the input image), the steps S1 to S9 are repeated.

If, in the setting decision step (S2), a setting command by the operator is determined to be received from the designation unit 9 through the external I/F circuit 6, a process for setting parameters to be recorded in the work memory 5 is waged in the setting process step (S10).

For example, coordinate transformation parameter T4 necessary for transformation from the camera coordinate system to the map (scene) coordinate system (three of pickup angle, mount height and focal distance of the image pickup unit 1 or values derived from the three values) is received as an input. Further, a scene image 31 resulting from projecting the input image 21 on a plane parallel to the ground surface is prepared by using the coordinate transformation parameter T4 and is displayed on the screen of display unit 10, permitting the operator watching this display to operate the designation unit 9, so that in response to this operation the designation of a desired area such as the polygon 32 is received which in turn is recorded in terms of area parameter T2 and size parameter T3 on the work memory 5. This will be detailed later.

When the setting process step (S10) ends, the program returns to the image input step (S1).

Referring to FIG. 2, an example of input image 21 picked up by the image pickup unit 1 and used for the object detection process of FIG. 8 is illustrated. The input image 21 contains an image of the building 22 and the like. The input image 21 can be displayed on the screen of the display unit 10.

Figure 3:
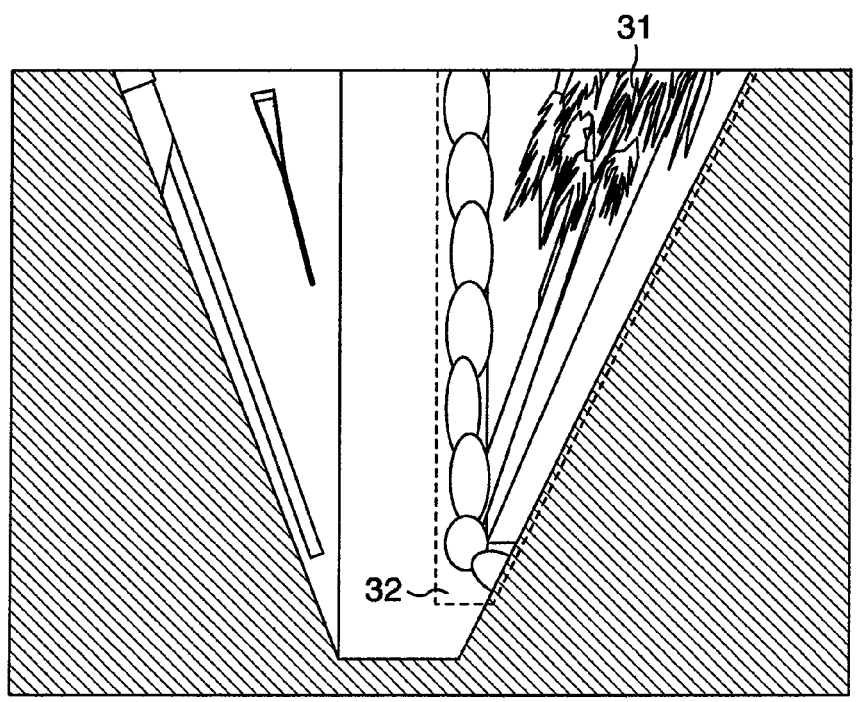
FIG. 3 is a pictorial view illustrating an example of a scene image and an example of setting of an area.

Illustrated in FIG. 3 is an example of a scene (map) image 31 which is an image as a result of transformation of the input image 21 to that on the scene (map) coordinate system. The scene image 31 can be displayed on the screen of display unit 10.

The scene image 31 is substantially analogous to a map of a monitor target area. In the present specification, a scene coordinate system obtained by exactly orthogonally projecting the ground surface representing the reference plane is termed a complete scene coordinate system. On the complete scene coordinate system, within the range restricted to the ground surface as reference, a right-angled portion of building transcribed in the image is displayed at right angles and a road of constant width is displayed as parallel lines. In this example, the operator operating the designation unit 9 while watching the scene image 31 displayed on the screen of display unit 10 designates an area by, for example, the polygon 32 on the scene image 31. The scene coordinate system used in this example need not always be a complete scene coordinate system but slight error may be tolerated. As will be described later, with a view to transcribing the size of an object, particularly, its height congruently, the complete scene coordinate system dare not sometimes be used.

Next, a process for transformation between a coordinate system of an image from the viewing point of the image pickup unit 1 (in this example, this is termed a camera coordinate system but is also called a screen coordinate system, picture coordinate system or image coordinate system) and a coordinate system of an image projected on a plane parallel to the ground surface (scene coordinate system, map coordinate system or world (global) coordinate system) will be described. The latter coordinate system will be used discriminately by terming a system having its origin placed at a point where the optical axis of the camera intersects the ground surface a scene coordinate system, terming a system having its origin placed at a position where the camera is installed a map coordinate system and terming a system having its origin placed at an arbitrary position a world coordinate system.

Figure 4:
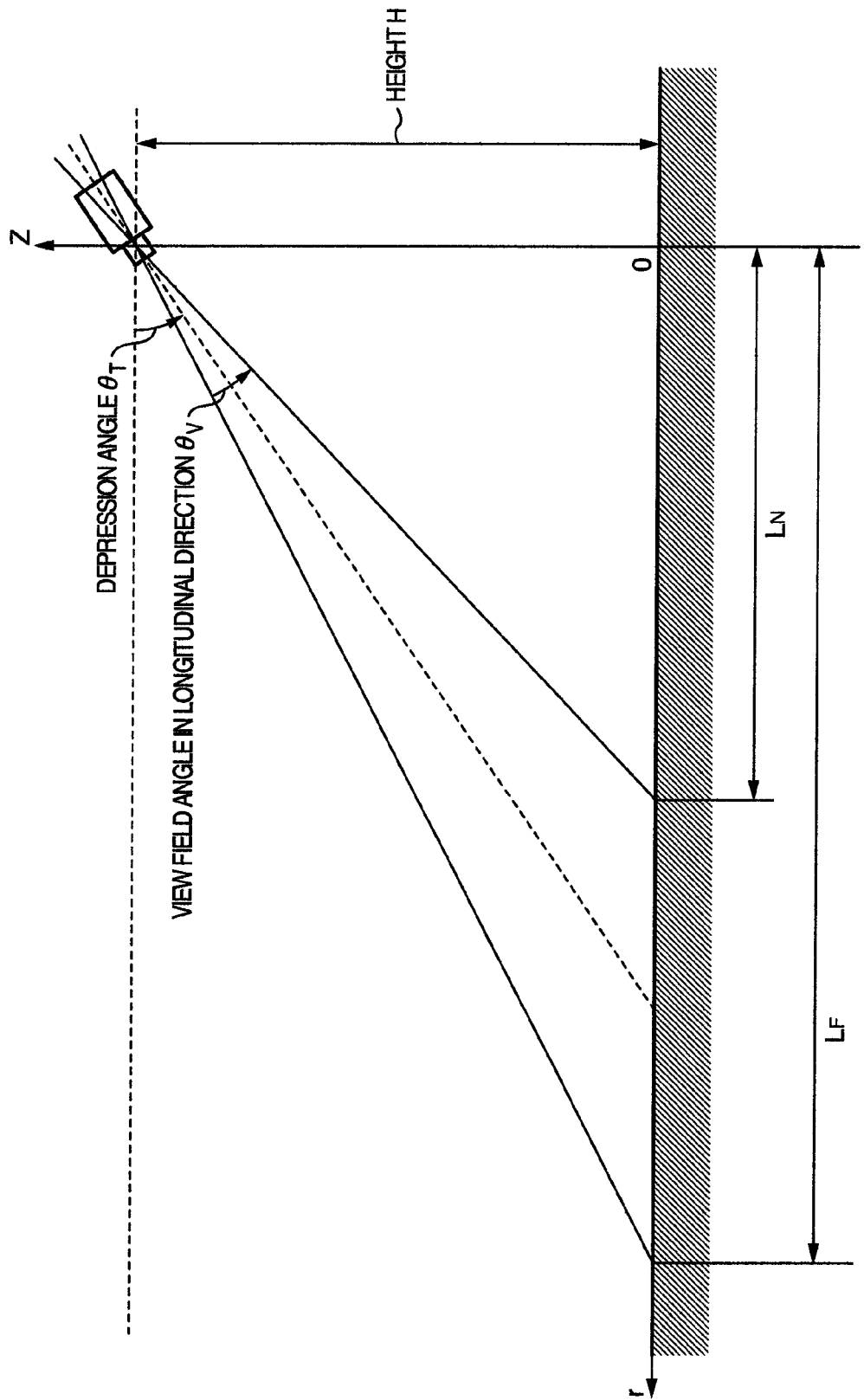
FIG. 4 is a diagram for explaining the coordinate transformation.

Referring to FIG. 4, there is illustrated an example of a status when the image pickup unit 1 is looked at in a direction parallel to the ground surface (directly sidewise). Illustrated in FIG. 5 is an example of a status when the image pickup unit 1 is looked at in a direction vertical to the ground surface (from directly above).

Figure 5:
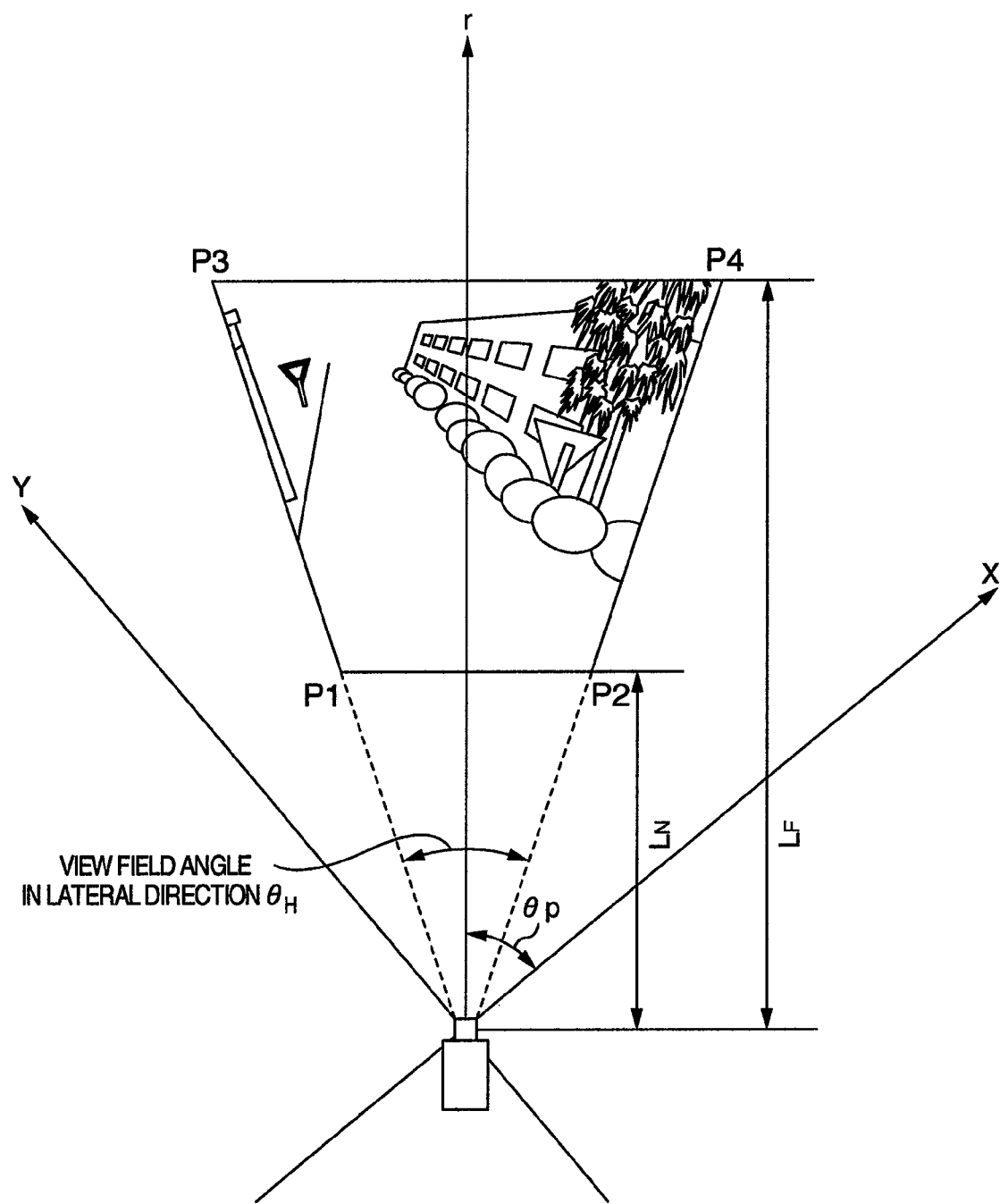
FIG. 5 is a diagram also for explaining the coordinate transformation.

In FIGS. 4 and 5, the origin of a map coordinate system is at the reference ground surface (horizontal surface) directly below the image pickup unit 1, X axis and Y axis are set on the ground surface, Z axis extends in the normal (height) direction and r axis is set in a panning direction (on X-Y plane) in which the image pickup unit 1 is directed.

Then, H represents the installation height of image pickup unit 1 (strictly, the height of the focal point of image pickup unit 1 from the ground surface), $\theta_T$ represents an angle of depression of image pickup unit 1, $\theta_V$ represents a view field angle in longitudinal direction of image pickup unit 1 and $\theta_H$ represents a view field angle in lateral direction. The view field angle $\theta_V$ in longitudinal direction of image pickup unit 1 can be calculated from the view field angle $\theta_H$ in lateral direction of image pickup unit 1 by using an aspect ratio of an imaging device (for example 4:3).

In the field of view of an image to be picked up by the image pickup unit 1, the nearest location ranges from the image pickup unit 1 to a horizontal distance $L_N$ and the farthest location ranges from the image pickup unit 1 to a horizontal distance $L_F$.

Firstly, for example, a direction at present of a pan-tilt adapted to change the position and direction of the image pickup unit 1 (for example, with the front of pan-tilt assumed to be an origin, pan angle $\theta_P$ and tilt angle $\theta_T$) is acquired and a focal distance f at present of an imaging lens of the image pickup unit 1 (strictly, an image distance equal to the sum of focal distance and feed-out amount) is acquired. On the basis of the thus acquired information, the position of the pickup range is computed.

A method of computing the position of the pickup range will be described. In this example, for simplification of explanation, it is assumed that the monitor target area is planar and the ground surface is removed of topographical irregularities.

The horizontal direction view field angle (picture angle) $\theta_H$ and the vertical direction view field angle (picture angle) $\theta_V$ the image pickup unit 1 has are determined from equations (1) and (2), respectively.

$$\theta_H = 2 \times \tan \frac{w}{2 \times f} \quad (1)$$

$$\theta_V = 2 \times \tan \frac{h}{2 \times f} \quad (2)$$

In these equations, w and h represent a lateral width and a longitudinal width, respectively, of an imaging device such as CCD device of the image pickup unit 1 and as an example, when an imaging device of ⅓ inches (device size being 4.8 mm×3.6 mm) is used, w=4.8 mm and h=3.6 mm stand. Then, in case the ⅓ inch imaging device is used with an imaging lens having a focal distance f=8.00 mm, the picture angles of image pickup unit 1 are $\theta_H$=33.4° and $\theta_V$=25.40. In other words, the field of view of the image pickup unit 1 ranges up to 33.4° in the lateral direction. Essentially, an image distance (representing a distance between back principal point and imaging plane which amounts to the sum of the focal distance and the payout amount) should be used in place of the focal distance f but pursuant to the lens formula, the image distance substantially equals the focal distance f given that a pickup target distance is sufficiently larger than the image distance. The focal distance f is changed through zooming.

Typically, the image pickup unit 1 is often installed at a higher position than the monitor target. Consequently, depending on the present direction $\theta_T$ of the pan-tilt, an area which cannot be picked up takes place directly below the image pickup unit 1. This area appears ranging from the position directly below the image pickup unit 1 to $L_N$ in the viewing direction. An area between distances $L_N$ and $L_F$ falls within the view field of the image pickup unit 1.

These distances $L_N$ and $L_F$ will be described.
The distances $L_N$ and $L_F$ are determined from equation (3).

$$L_N = H \times \tan\left(90° - \theta_T - \frac{\theta_V}{2}\right) \quad (3)$$

$$L_F = H \times \tan\left(90° - \theta_T + \frac{\theta_V}{2}\right)$$

As a result, the range for permitting the image pickup unit 1 to pick up falls within a triangular area contoured by the image pickup unit 1, a point at distance $L_N$ and a point at distance $L_F$ as shown in FIG. 4 or within a trapezoidal area contoured by points P1, P2, P3 and P4 as shown in FIG. 5.

As an example, when the ⅓ inch imaging device is used with the focal distance of imaging lens being f=8.00 mm, the present direction of pan-tilt being $\theta_T$=30° and the installation height of image pickup unit 1 being H=5.0 m, $L_N$=5.42 m and $L_F$=16.1 m result.

As described above, the position of the view field range of image pickup unit 1 can be computed in accordance with equations (1) to (3).

On the basis of the result as above, map coordinates of respective apecies P1, P2, P3 and P4 of the view field range shown in FIG. 5, indicated by P1=(x1, y1), P2=(x2, y2), P3=(x3, y3) and P4=(x4, y4), are determined from equations (4) to (7).

$$x1 = L_N \cos\theta_P + L_N \tan\frac{\theta_H}{2}\sin\theta_P \quad (4)$$

$$y1 = -L_N \sin\theta_P + L_N \tan\frac{\theta_H}{2}\cos\theta_P$$

$$x2 = L_N \sin\theta_P - L_N \tan\frac{\theta_H}{2}\sin\theta_P \quad (5)$$

$$y2 = -L_N \sin\theta_P - L_N \tan\frac{\theta_H}{2}\cos\theta_P$$

$$x3 = L_F \cos\theta_P + L_F \tan\frac{\theta_H}{2}\sin\theta_P \quad (6)$$

$$y3 = -L_F \sin\theta_P + L_F \tan\frac{\theta_H}{2}\cos\theta_P$$

$$x4 = L_F \cos\theta_P - L_F \tan\frac{\theta_H}{2}\sin\theta_P \quad (7)$$

$$y4 = -L_F \sin\theta_P - L_F \tan\frac{\theta_H}{2}\cos\theta_P$$

In these equations, $\theta_P$ represents a panning angle of image pickup unit 1 the X axis makes to the optical axis of image pickup unit 1. It is sufficient that the trapezoidal area contoured by the points P1 to P4 can be displayed without alteration.

At the individual points of the view field range of image pickup unit 1, an input image is transformed to that on the scene coordinated system which in turn is displayed on the screen of display unit 10.

Figure 6:
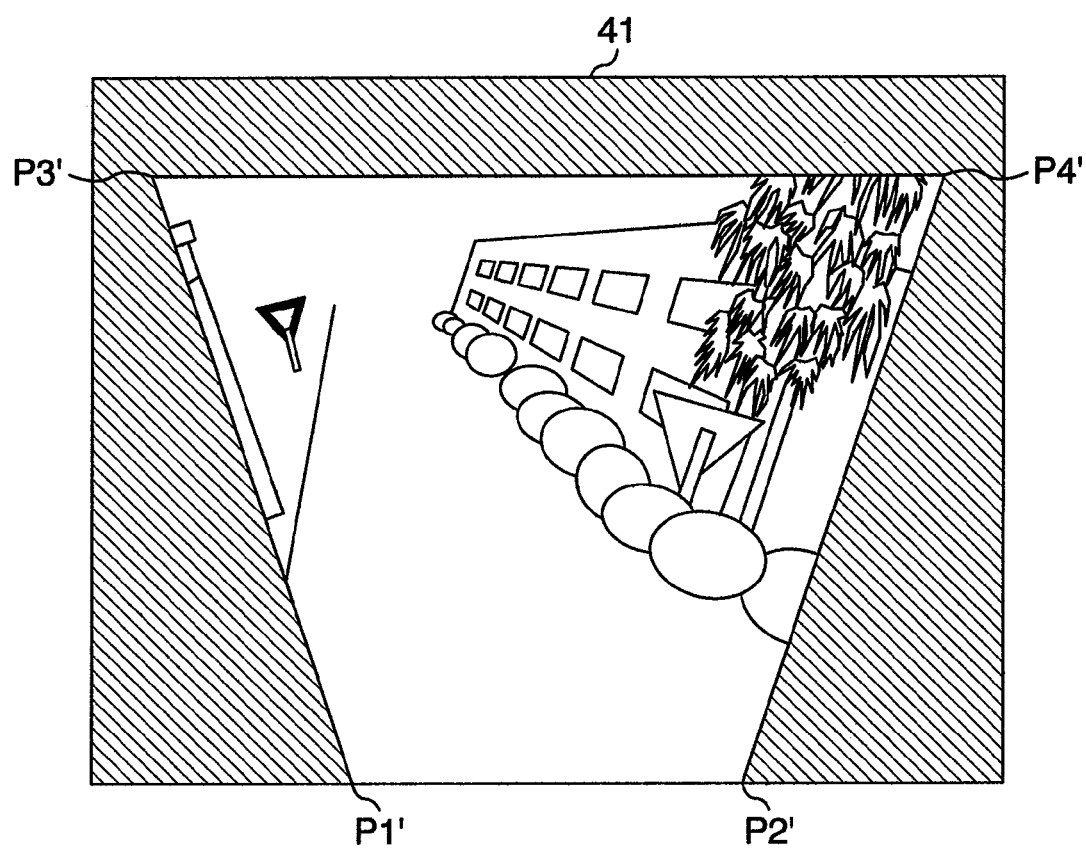
FIG. 6 is a diagram also for explaining the coordinate transformation.

An example of an image on the scene coordinate displayed on the screen 41 is illustrated in FIG. 6. Illustrations in FIGS. 5 and 6 are insufficient in accuracy on account of problems on drawing technique and so they are schematically depicted at the most.

In this example, four points P1', P2', P3' and P4' shown in FIG. 6 correspond to the four points P1, P2, P3 and P4 shown in FIG. 5, respectively. In this correspondence, the trapezoid indicated by P1 to P4 is transformed to a trapezoid defined by P1' to P4' without alteration. In the display, the points P3' and P4' are positioned at an upper portion of screen 41 and the points P1' and P2' are positioned at a lower portion of screen 41.

An image displayed on the screen 41 can be restricted in depth distance $L_F$ and as an example, with the depth limited to 25 [m], part of the transformed pixels forming a portion having r coordinates which exceed 25 [m] cannot be displayed on the screen 41.

Similarly, an image displayed on the screen 41 can be restricted in frontal distance $L_N$ and as an example, with the frontal distance limited to 10 [m], part of the transformed pixels forming a portion having r coordinates which are less than 10 [m] cannot be displayed on the screen 41.

When the coordinate transformation parameter T4 is set properly, the screen 41 can approach from FIG. 6 to that shown in FIG. 3. Then, as shown in FIG. 3, the area parameter T3 is set as a polygon on the ground surface on the map (scene) coordinate system and the size parameter is set area by area.

For the area, various shapes other than the polygon can be designated. Further, a mode can be set and used in which, for example, the area on the screen is divided into a plurality of blocks and each block is set as to whether to be a target area (on or off).

The information set on the scene image 31 is not particularly limitative and various kinds of information may be employed including, for example, the distance, moving speed or acceleration and a size condition (for example, threshold) adapted for deciding whether an object is a human being or an animal in order for the human to recognize the object easily on a plan view such as a map. The moving speed or acceleration can be computed from positions at the latest, at one preceding time and at two preceding times of a labeled lump and is sometimes useful to decide the kind of object.

The present example shows the mode of transforming the image 21 picked up by the image pickup unit 1 to that on the coordinate of the scene image 31 and displaying it but as another example, a mode can also be used in which as information of a map of an area including a monitor target area, information such as a design drawing or a commercially available map or air photograph is stored in the memory in advance and the map information of an area corresponding to the image 21 picked up by the image pickup unit 1 is read out of the memory and displayed.

Also, the image processing may be carried out on, for example, either the camera coordinate system or the scene coordinate system but typically, an image obtained from the image pickup unit 1 is on the camera coordinate system and therefore, the processing carried out on the camera coordinate system is considered to be more efficient (except the setting of area in this example).

As has been described, the monitor apparatus of the present embodiment 1 (an example of image processing apparatus) comprises image pickup means for fulfilling the function of image pickup unit 1, transformation means for fulfilling the function of the image processing processor 3 to transform an image on the first coordinate system (camera coordinate system) to an image on the second coordinate system (scene coordinate system), display means for fulfilling the function to display the image on the screen of the display unit 10 and reception means for fulfilling the function to receive information inputted by the user operating the designation unit 9.

The second coordinate system on which sizes are transcribed as remaining substantially unchanged irrespective of the distance is, for example, an orthonormal coordinate system (including its approximation of non-linear or non-orthogonal coordinate system) in which the horizontal ground surface is set as a reference plane and two axes are set up on the ground surface (earth surface). The second coordinate system can be handled as a two-dimensional coordinate system obtained by orthogonally projecting the ground surface in the normal direction. The second coordinate system corresponds to the scene coordinate system ($\zeta$-$\psi$-Z), map coordinate system (X-Y-Z) or global coordinate system ($X_G$-$Y_G$-$Z_G$).

For example, the above construction can solve the problem that apparent sizes differ depending on positions on an image as in the case of a difference in size between an image upper portion and an image lower portion and therefore, even when designating an area at a constant distance from a building, the operator can designates the area easily on the basis of a map image.

Embodiment 2

In embodiment 2, the area parameter in the monitor apparatus of the previous embodiment 1 is adaptively set on the basis of a detection object representing a reference to enable an object approaching the reference object, for example, to be detected. Unless particularly noticed, the hardware construction a monitor apparatus of the present embodiment 2 has and the general process procedures are identical to those in embodiment 1 shown in FIGS. 1 and 8. Constituent components corresponding to but not identical in construction to those in embodiment 1 are designated by reference numerals added with 200 for explanation purpose only (not for illustration) to avoid prolixity of illustration.

Figure 10:
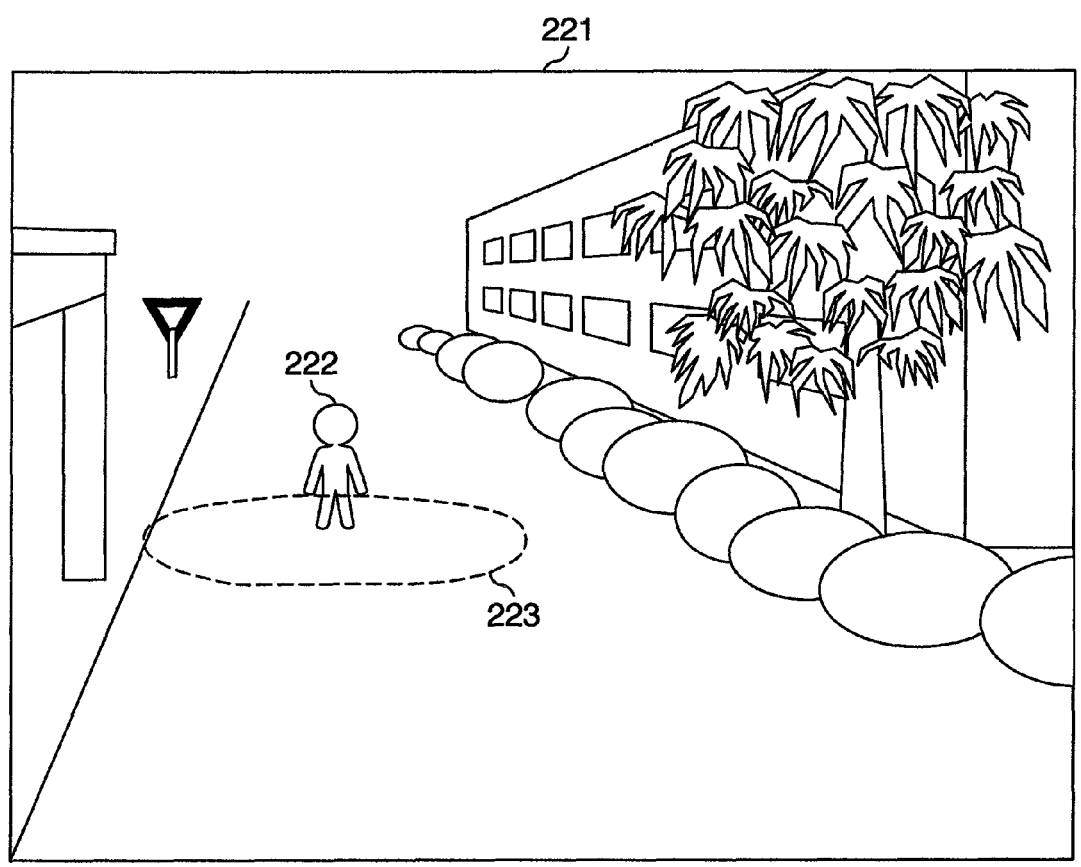
FIG. 10 is a pictorial view illustrating an example of an input image acquired in image input step S201 in embodiment 2.

Referring to FIG. 10, an input image 221 acquired in image input step S201 is illustrated. The input image 221 is displayed on the display unit 10 in process result display step S209. In the input image 221 of FIG. 10, an object 222 such as for example a prominent person required of guard or a smuggler of medicine is transcribed.

When the operator selects the object 222 by using the designation unit 9 and then designates a predetermined radius (for example, 10 m), the image processing processor 3 gives to the input image 221 an overlay display of an elliptical area 223 centered on the position (ground position) of the object 222. Then, a label number of object 222 and the radius (and position) of area 223 are set as area parameters. Further, on the basis of a size of object 222 appearing at the time that the operator selects the object, a size parameter for the object 222 is set. In the succeeding process result display step S209, too, the overlay display of area 223 is given to the input image 221 on the basis of the latest position of the object 222 and the radius as well.

Figure 11:
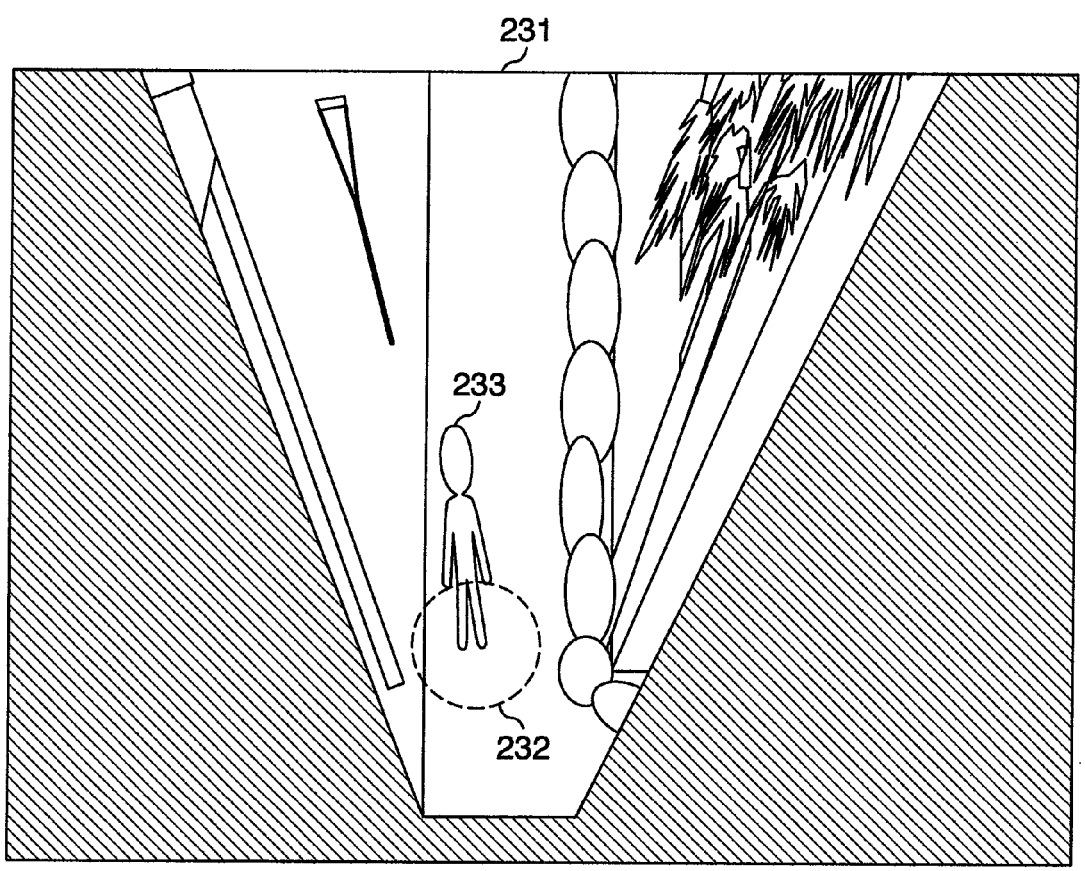
FIG. 11 is a pictorial view illustrating a scene image obtained by causing the input image in FIG. 10 to undergo coordinate transformation.

Turning to FIG. 11, the input image 221 of FIG. 10 is transformed to that on the scene (map) coordinates to obtain a scene image 231 as illustrated therein.

A circular area 232 corresponds to the area 223 to take the form of a circle centered on the ground position of an object 233 on the scene (map) coordinate system. The radius of circular area 232 is one designated by the operator.

Like embodiment 1, the object 233 is detected through steps ranging from the difference process step (S3) to area decision process step (S208) through the coordinate transformation step (S7) and the latest position can be grasped constantly.

For detection of the object 233, another kind of algorithm such as template matching may be adopted or pan-tilt control (tracking) for making the object 233 be transcribed in the center of the image may be taken.

In area decision process step S208, the image process processor 3 first decide whether a lump allotted with the same label number as that of the object 222 set in the area parameter satisfies the size parameter. If the lump is determined to satisfy the size parameter, the lump is detected as the object 222 and based on the position of object 222 and the area parameter, the monitor area is updated. Then, the presence or absence of a different object satisfying the predetermined size parameter inside the updated monitor area is searched and when the different object is detected, a predetermined output is delivered.

The different object can be decided as to whether to be within the monitor area or not by comparing the distance between the object 222 and the different object with the designated radius. If the object 222 is missed visually, that is, when the lump satisfying the size parameter of the same label cannot be detected sequentially predetermined times, the area parameter corresponding to the object 222 is erased.

In process result display step S209, the image processing processor 3 responds to the predetermined output delivered in the area decision process step S208 to display the detected different object conspicuously on the screen or to give the alarm.

In the present example, since the monitor area essentially becomes elliptical having a major axis in the horizontal direction and mere designation of only the central object and radius suffices, setting of the area per se on the camera coordinates does not face difficulties.

Alternatively, the monitor area may be set in the form of an elliptical area 223 on the camera coordinates and detection of an object inside the area 223 can be carried out on the now prevalent camera coordinates. In other words, the area 223 is approximated by a polygon, coordinates of its apecies are stored as area parameter T3 and thereafter, what appears is decided as to whether to be within the polygon or not as in the case of embodiment 1.

As described above, in the monitor apparatus according to the present example, the monitor area is updated as desired and therefore, for a moving object, the monitor area can be set properly and maintained independently of the distance of the object from the camera.

Embodiment 3

In the present embodiment 3, the coordinate system transformation in the monitor apparatus according to the preceding embodiments 1 and 2 is slightly improved so as to be suitable for designation of the size (size parameter) of an object to be detected. In addition, the user is permitted to interactively input coordinate transformation parameters necessary for the coordinate system transformation.

Figure 12:
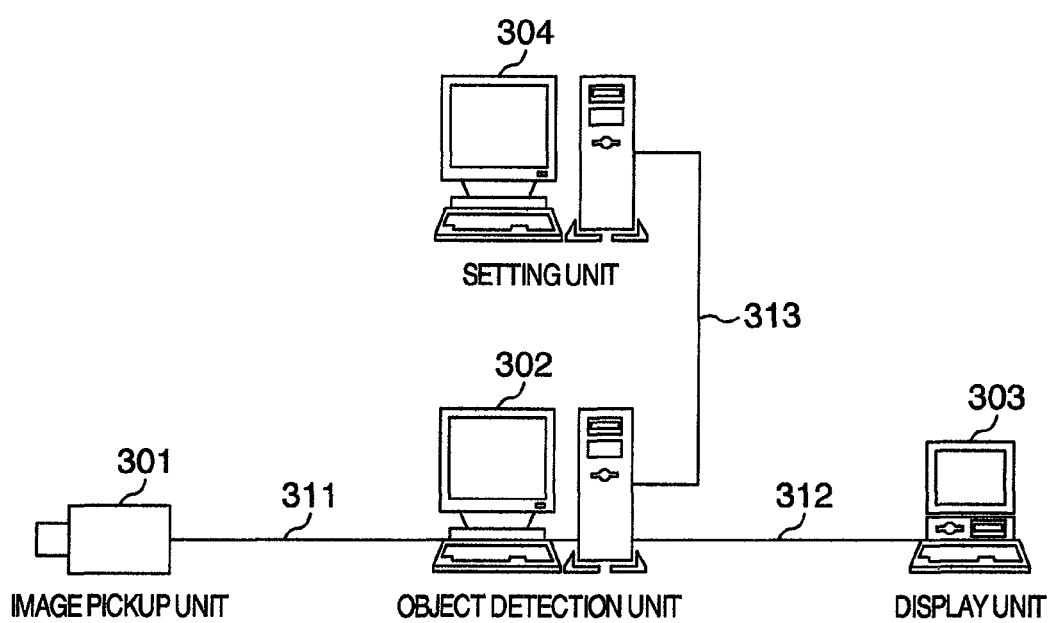
FIG. 12 is a diagram showing an example of configuration of a monitor system according to embodiment 3.

An example of configuration of a monitor system according to the present example is illustrated in FIG. 12.

The monitor system of this example comprises an image pickup unit 301, an object detection unit 302, a display unit 303, a setting unit 304, an access line 311 connecting the image pickup unit 1 and the object detection unit 2, an access line 312 connecting the object detection unit 302 and the display unit 303 and an access line 313 connecting the object detection unit 302 and the setting unit 304.

The image pickup unit 301, comprised of a camera for picking up an image (video), for instance, picks up an image of an area to be monitored (monitor target area) and transmits to the object detection unit 302 data of the picked-up image and status of the camera (values of panning, tilting and zooming (focal distance), CCD size and the like) by way of the access line 311. Hereinafter, actual values of panning, tilting and zooming in the camera will be called actual camera parameters.

The object detection unit 302 receives the image data transmitted from the image pickup unit 301 and on the basis of the inputted image data and information set for detection of an object, detects an object intruding into the monitor target area and transmits information for display to the display unit 303 through the access line 312.

Used as the information to be transmitted from the object detection unit 302 to the display unit 303 referred to herein are various kinds of information including, for example, information of an image transcribing a detected object (image data), information indicative of the result of detection of the object, information of camera parameters set in advance by the setting unit 304, information such as actual camera parameters of the image pickup unit 301 and information which can be obtained from two or more of the above information pieces. These pieces of information can be transmitted to the setting unit 304 (if requested).

The object detection unit 302 also transmits the data of the image received from the image pickup unit 301 or data resulting from processing the image data to the setting unit 304 through the access line 313.

The display unit 303 receives and inputs the information transmitted from the object detection unit 302 and displays the inputted information or information resulting from processing the input information on the screen.

The setting unit 304 has an operation section such as for example a keyboard or a mouse operated by the operator (person) and receives various kinds of setting information in accordance with the contents of operation by the operator and transmits the received setting information to the object detection unit 302 through the access line 313.

The setting unit 304 also has a memory for storing setting information at present and prescribed setting information as well and a screen for giving a display of information to the operator and it delivers the image data received from the object detection unit 302 and information consulted by the operator for the purpose of setting various kinds of setting so as to display them on the screen.

As each of the access lines 11 to 13, various kinds of communication lines may be used including, for example, an analog telephone network, an ISDN (Integrated Services Digital Network) or an IP network (internet).

Next, operation executed by the setting unit 304 of the present example will be described.

Figure 13:
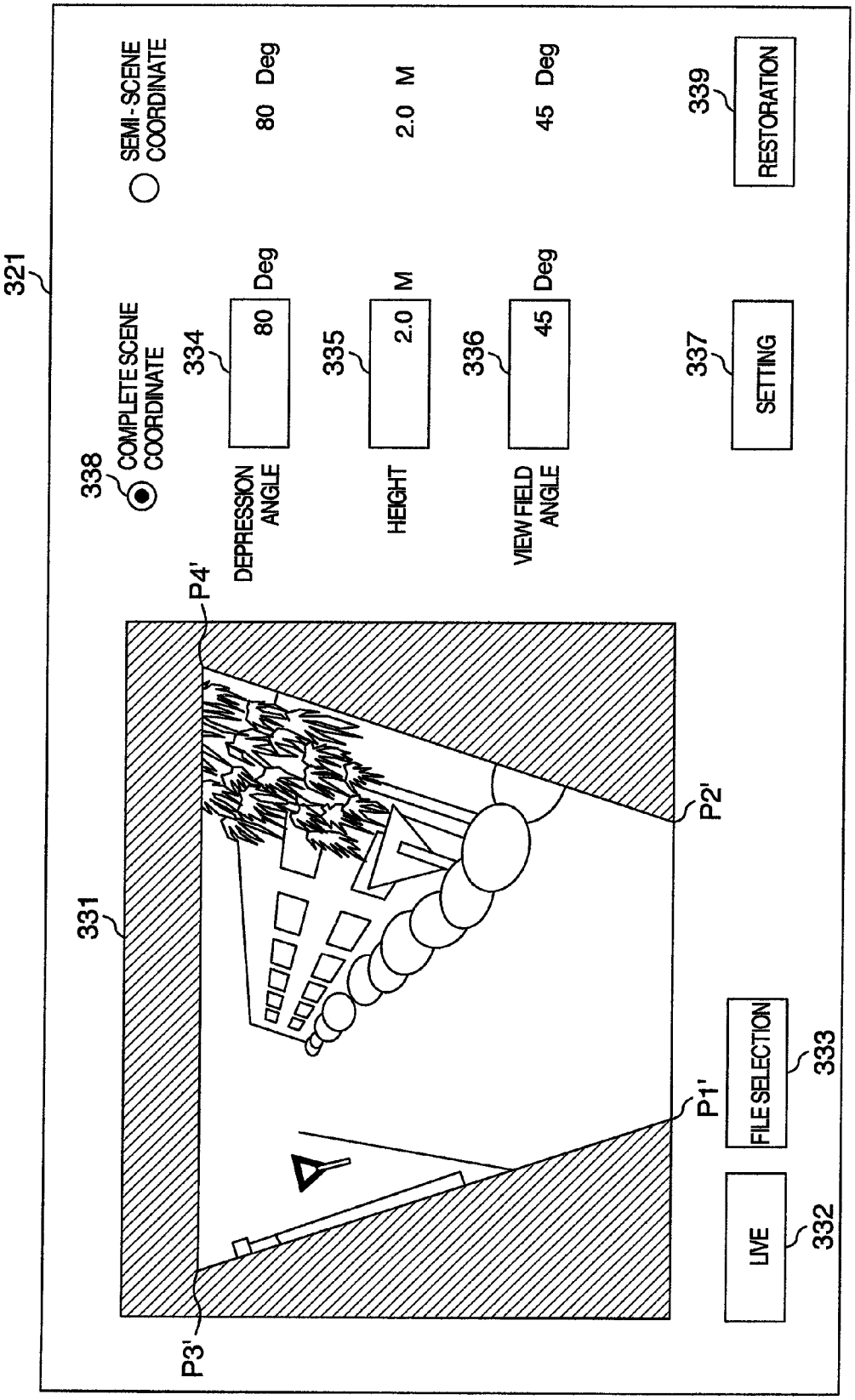
FIG. 13 is a diagram showing an example of an operation screen displayed by setting unit 304 in embodiment 3.

Referring to FIG. 13, there is illustrated an example of an operation screen (setting screen) 321 displayed by the setting unit 304.

Displayed on the operation screen 321 of this example are an image display region 331 for displaying an image, a live button 332 adapted to display a live image, a file selection button 333 adapted to select a file, a depression angle parameter setting test box (TB) 334 used for setting a parameter of depression angle, a height parameter setting TB 335 used for setting a parameter of height, a view field angle parameter setting TB 336 for setting a parameter of view field angle, a parameter setting button 337 adapted to designate parameter setting, a coordinate system selection radio box 338, and a recovery button 339.

Here, three values inputted to the respective text boxes of depression angle parameter setting TB 334, height parameter setting TB 335 and view field angle parameter setting TB 336 are values of parameters of depression angle, height and view field angle (which is concerned with density of pixels on focal length) the image pickup unit 301 (in this example, exemplified by a camera) has. In this example, these parameters are called camera parameters.

The setting unit 304 has the function to transform data of image on the first coordinate system (in this example, camera coordinate system) to image data on the second coordinate system (in this example, complete scene coordinate system) and on the third coordinate system (in this example, semi-scene coordinate system).

In the present example, an image on the camera coordinate system is an image per se picked up by the image pickup unit 301, an image on the complete scene coordinate system is an image analogous to a map of a monitor target area and an image on the semi-scene coordinate system is an image in which the object height in the vertical direction is proportional to the actual height irrespective of the distance from the image pickup unit 301 (or an approximate image). The first and second coordinate systems are mutually transformed based on the camera parameter. The first and third coordinate systems are mutually transformed based on a modified camera parameter obtained by modifying the camera parameter.

The operator makes a choice of which camera parameter is to be inputted by using the coordinate system selection radio box 338.

An input image acquired by the image pickup unit 301 (identical to FIG. 2) is transformed to an image on the coordinate system based on camera parameters inputted at present to the individual text boxes 334 to 336 and the thus transformed image is displayed in the image display region 331.

Used as the camera parameter are values stored in advance in the setting unit 304 or values calculated from the actual camera parameter which can be defined automatically as default values inputted to the individual text boxes 334 to 336. But, in case the pan and zoom of the image pickup unit 301 are fixed, the pan-zoom value and height parameter are stored in advance in the setting unit 304 or they lack default values. As an example of default values, the depression angle parameter, height parameter, and view field angle parameter may take values of 45[Deg], 1.0 [M] and 45 [Deg], respectively.

Immediately preceding parameters are displayed on the right sides of the individual text boxes and when the operator pushes the restoration button 339, the immediately preceding parameters now displayed are inputted to the text boxes automatically.

Two methods used for displaying an image on the image display region 331 will now be described.

In a (first method), when the live button 332 is depressed on the screen through operation by the operator, a request for an image is transmitted from the setting unit 304 to the object detection unit 302 and in response to reception of the request by the object detection unit 302, data of the latest image picked up by the image pickup unit 1 is transmitted from the object detection unit 302 to the setting unit 304, thereby causing the setting unit 304 to apply coordinate transformation to the acquired image data on the basis of camera parameters which have been inputted in the individual text boxes 334 to 336 or modified camera parameters and to display the image data subject to the coordinate transformation.

In a (second method), still images picked up in advance by the image pickup unit 301 are prepared and when the file selection button 333 is depressed on the screen through operation by the operator, a file selection dialogue indicative of selectable files is displayed on the screen and an image (for example, a file name of the image) is selected on the screen through operation by the operator, followed by transformation of the data of the image concerned to data of an image on the world coordinate system and display of the transformed image data.

Alternatively, in the first and second methods, a display may be given by using a motion picture, for instance. In using the motion picture, a button for reproduction of motion pictures and a button for temporary stop or pause, for example, are additionally displayed on the operation screen 321 and with the motion picture stopped temporarily, setting of camera parameters can be executed by the operator.

The view field angle $\theta_V$ in the longitudinal direction of image pickup unit 301 is determined by an aspect ratio (longitudinal/lateral ratio) of the imaging device of image pickup unit 301 used and when, for example, a device having a ratio of 4 of lateral width to 3 of longitudinal width is used, the longitudinal direction view field angle $\theta_V$ is 75% of the lateral direction view field angle $\theta_H$. Since the longitudinal direction view field angle $\theta_V$ and lateral direction view field angle $\theta_H$ of the image pickup unit 1 can be unified into a single piece of information in this manner, the view field angle of image pickup unit 301 is set representatively by the lateral direction view field angle $\theta_H$ in the present example.

The operator sets individual parameters of depression angle $\theta_T$, height H and view field angle $\theta_H$ by using the respective setting text boxes 334 to 336.

Each time that the parameters of the individual text boxes 34, 35 and 36 are changed, the setting unit 304 updates, on the basis of the changed parameters, an image on the world coordinate system to be displayed on image display unit 331 and at the same time, stores the parameters before change and displays them in pale color on the right side of each of the text boxes.

The operator adjusts numerical values of the individual text boxes 334 to 336 while watching the image on the world coordinate system displayed on the image display unit 331.

For example, when the operator watching the image displayed on the image display unit 331 adjusts a given object on the ground surface (for example, white lines of a road or a parking area) such that the length, width and angle of the object can be analogous to those of an actual object irrespective of the distance image from the image pickup unit 301, these parameters can be optimized as camera parameters on the complete scene coordinate system. Further, when an object having a predetermined height is adjusted such that the height can be analogous to that of an actual object irrespective of the distance image from the image pickup unit 301, the height can be optimized as a modified camera parameter on the semi-scene coordinate system.

With the camera parameter set properly, the image on the complete scene coordinate system is featured in that it is related analogously to a map of a monitor target area and for example, a road transcribed in the image can be displayed as parallel lines and a corner portion of a building is displayed at right angles.

Accordingly, like an image 31 as shown in FIG. 3, the operator adjusts the individual text boxes 34 to 36 such that the width of a road (road width) can be constant in the front and in the depth as well on the screen to display parallel lines on the screen.

On the other hand, the modified camera parameter can be set easily by causing the operator to visually confirm whether a structure such as a building window, a fence, a parapet of bridge or a pole which is deemed as having a constant height in an image on the semi-scene coordinate system can remain unchanged in its height in an image after coordinate transformation displayed on the image display unit 331.

In addition, when a plurality of traffic cones or pylons each having exactly the same shape actually are transcribed on different positions on the screen, shapes of the plural traffic cones (widths, heights and the like) can be adjusted so as to be coincident with one another on the screen.

The setting unit 304 may have the function to draw and display an auxiliary line on the image display region 331 when the aforementioned parameter adjustment is made.

For example, the auxiliary line can be used in the mode of using a longitudinal or lateral line, using a line with graduation or displaying the line length in numerical value. Structurally, the operator can perform addition or deletion or copy of the auxiliary line, its change in length or movement of its position through operation.

The auxiliary line as above is useful to confirm whether, for example, a road is transcribed as parallel lines and besides, to measure the length (height) on the screen.

A method of saving the camera parameter set by the setting unit 304 will be described.

In this example, when the parameter setting button 337 is depressed on the screen through operation by the operator, three parameters set by the individual text boxes 334 to 336 are saved, as camera parameters for the coordinate system now selected by the coordinate system selection radio button, in the memory or file of the setting unit 304 together with the actual camera parameters at present and besides they are transmitted to the object detection unit 302 through the access line 313.

The setting unit 304 may receive, in addition to the camera parameters, inputs indicative of background image T1, area parameter T2 and size parameter T3 as in the embodiment 1 to transmit them to the object detection unit 302.

Reception of the input of area parameter T2 is acknowledged when the user designates a plurality of points on the image display region 331. Depending on the status of the coordinate system selection radio box at that time, a decision is made as to which one of the complete scene coordinate system and semi-scene coordinate system the area parameter T2 is received on and the received area parameter is transmitted together with information concerning the determined coordinate system to the object detection unit 302.

Reception of the input of size parameter T3 can be acknowledged in terms of the absolute value of some meters which does not depend on the coordinate system or by acknowledging the receipt of the height and width designated on the screen as in the case of the area parameter T2 along with information concerning the coordinate system used for designation.

On the assumption that the camera parameter, modified camera parameter and actual camera parameter are each a kind of the coordinate transformation parameter T4 in embodiment 1, the following description will be given.

Operation executed by the object detection unit 302 of this example will be described.

The object detection unit 302 performs an operation substantially identical to the image processing in embodiment 1 as shown in FIG. 8. But, coordinate system transformation process S7', area decision process S8' and parameter setting process S10' are executed in substitution for the coordinate system transformation process S7, area decision process S8 and area setting process S10.

In the parameter setting process S10', camera parameter or modified camera parameter received from the setting unit 304 is stored as coordinate transformation parameter T4 in correspondence with actual camera parameter. Alternatively, the relation between the camera parameter or modified camera parameter and the actual camera parameter as expressed by the difference, ratio or predetermined function may be stored. When other types of parameters are received, they are merely stored.

In the coordinate system transformation process S7', for each labeled lump, the position, height and width are transformed to those on the second coordinate system (complete scene coordinate system) and third coordinate system (semi-scene coordinate system), respectively. For transformation to the second and third coordinate systems, the camera parameter and modified camera parameter stored in the parameter setting process S10' are used, respectively.

When the tilt and pan of the imaging device 301 change, however, (modified) camera parameter is used which is transformed on the basis of the actual camera parameter of the image pickup unit prevailing when an image from which the lump originates is picked up in order that the relation can be maintained which is expressed by the difference or ratio between the (modified) camera parameter received from the setting unit 304 and the actual camera parameter.

In the area decision process S8', when a labeled lump having the length (height) and width corresponding to the size parameter T3 exists in an area designated by the area parameter T2, the lump is determined as an intrusion object. At that time, for the position, height and width which are transformed in the coordinate system transformation process S7', those on the same coordinate system as the coordinate system used to designate the individual parameters are selectively used.

According to what is intended by the present embodiment, it is preferable that the area parameter T2 and the width of size parameter T3 be designated on the second coordinate system and the height of size parameter T3 be designated on the third coordinate system. Structurally, the operator can select one of the above modes at will according to the present embodiment.

The coordinate transformation waged in the coordinate transformation process S7' will now be described in general. The following description can also be adapted for the coordinate system transformation process S7.

Figure 14:
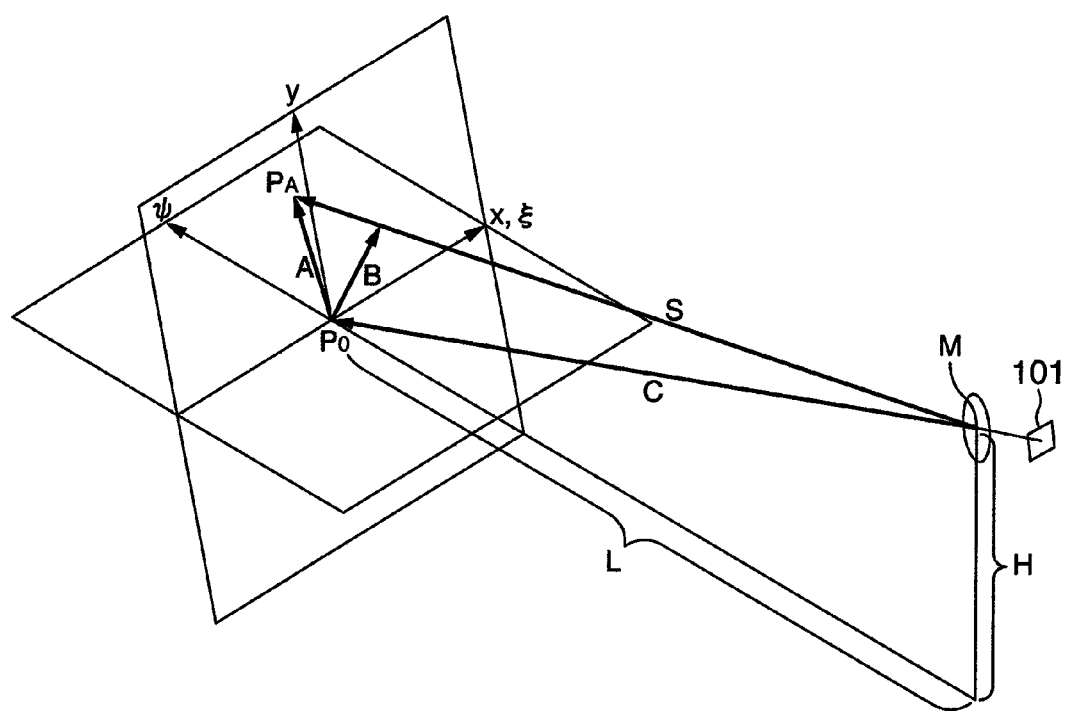
FIG. 14 is a perspective view showing camera coordinate axes, scene coordinate axes and imaging device 301.

Referring to FIG. 14, the camera coordinate axes, scene coordinate axes and image pickup unit 301 are illustrated in perspective view form.

A point M is an optical principal point of a lens of image pickup unit 301 and the optical axis of the lens extending from the optical principal point intersects the ground surface representing the reference plane to provide a point $P_0$. A vector directing from the point M to the point $P_0$ is C. Then, on the optical axis rearwardly of the optical principal point, an imaging device 101 is located.

The scene coordinate ($\zeta$-$\psi$-Z coordinate) has its origin at $P_0$, $\zeta$ axis and $\psi$ axis on the reference ground surface and Z axis normal to the reference ground surface. The $\zeta$ axis is orthogonal to the vector C.

The camera coordinate (x-y coordinate) is set up having its origin at $P_0$ and x axis and y axis on a plane vertical to the vector C. The x axis coincides with the $\zeta$ axis. As will be understood easily, the camera coordinate on the x-y plane is completely analogous to the coordinate on the imaging device.

Assumptively, the scene coordinate is the complete scene coordinate and both the camera coordinate and the scene coordinate are orthonormal coordinate systems.

The vector C is expressed by $C=[0 -L\ H]^T$ on the scene coordinate ($\zeta$-$\psi$-Z).

A vector S directing from the point M to an arbitrary point $P_A$ is set up. A vector A directing from the point $P_0$ to the point $P_A$ is also defined. Further, a vector B directing to a point at which the vector S intersects the x-y plane is defined.

Since the camera coordinate (x-y) results from rotating the scene coordinate ($\zeta$-$\psi$-Z) by $\tan^{-1}$ (L/H) about the center of $\zeta$ axis, the following two equations stand.

$$\begin{bmatrix} A_\xi \\ A_\psi \\ A_Z \end{bmatrix} = \begin{bmatrix} 1 & 0 \\ 0 & \sin\theta_T \\ 0 & \cos\theta_T \end{bmatrix} \begin{bmatrix} A_x \\ A_y \end{bmatrix} \quad (8)$$

$$\begin{bmatrix} A_x \\ A_y \end{bmatrix} = \begin{bmatrix} 1 & 0 & 0 \\ 0 & \sin\theta_T & \cos\theta_T \end{bmatrix} \begin{bmatrix} A_\xi \\ A_\psi \\ A_Z \end{bmatrix} \quad (9)$$

At that time, the following relation is held among the individual vectors A, B and C.

$$\vec{C} + \vec{B} = \alpha \cdot \vec{S} = \alpha \cdot (\vec{C} + \vec{A}) \quad (10)$$

$$\alpha = \frac{B_\xi}{A_\xi} = \frac{B_\psi + L}{A_\psi + L} = \frac{H - B_Z}{H - A_Z} \quad (11)$$

where $\alpha$ represents the imaging magnification.

Equation (10) is reduced in respect of the vector B and expressed in terms of matrix on the scene coordinate as follows:

$$\begin{bmatrix} B_\xi \\ B_\psi \\ B_Z \end{bmatrix} = (\alpha - 1) \begin{bmatrix} 0 \\ -L \\ H \end{bmatrix} + \alpha \begin{bmatrix} A_\xi \\ A_\psi \\ A_Z \end{bmatrix} \quad (12)$$

By substituting equation (9) to equation (12), $$\begin{bmatrix} B_x \\ B_y \end{bmatrix} = (\alpha - 1) \begin{bmatrix} 0 \\ H\cos\theta_T - L\sin\theta_T \end{bmatrix} + \alpha \begin{bmatrix} 1 & 0 & 0 \\ 0 & \sin\theta_T & \cos\theta_T \end{bmatrix} \begin{bmatrix} A_\xi \\ A_\psi \\ A_Z \end{bmatrix} \quad (13)$$

results. Especially, by giving $A_Z=0$, $\alpha$ is expressed by $$\alpha = \frac{H - B_Z}{H} = 1 - \frac{A_\psi}{A_\psi + L + H^2/L} \quad (14)$$

in a simplified formula of the vector A. Therefore, equation (13) is $$\begin{bmatrix} B_x \\ B_y \end{bmatrix} = \frac{A_\psi}{A_\psi + L + H^2/L} \begin{bmatrix} 0 \\ L\sin\theta_T - H\cos\theta_T \end{bmatrix} + \quad (15)$$

$$\frac{L + H^2/L}{A_\psi + L + H^2/L} \begin{bmatrix} 1 & 0 \\ 0 & \sin\theta_T \end{bmatrix} \begin{bmatrix} A_\xi \\ A_\psi \end{bmatrix}$$

Similarly, equation (10) is solved for the vector A as follows:

$$\begin{bmatrix} A_\xi \\ A_\psi \end{bmatrix} = \frac{B_Z}{H - B_Z} \begin{bmatrix} 0 \\ L \end{bmatrix} + \frac{H}{H - B_Z} \begin{bmatrix} B_x \\ \sin\theta_T \cdot B_y \end{bmatrix} \quad (16)$$

$$B_Z = \cos\theta_T \cdot B_y$$

As will be seen from equation (10), of the parameters used in equation (16), L corresponds to a depression angle (namely, $L = H \cdot \cot\theta_T$) and $\alpha$ corresponds to a view field angle (namely, $\alpha \propto 1/\theta H$).

With the above in mind, it will be understood that a pixel value $P_S(\zeta, \psi)$ of the image transformed to that on the scene coordinate can be determined from a pixel value $P_C(x, y)$ of the camera image pursuant to equation (17).

$$Ps(\xi, \psi) = \quad (17)$$

$$Pc\left(\frac{L + H^2/L}{\psi + L + H^2/L} \cdot \xi, \frac{L\sin\theta_T - H\cos\theta_T + (L + H^2/L)\sin\theta_T}{\psi + L + H^2/L} \cdot \psi\right)$$

In other words, by computing, pixel by pixel, equation (17) for $\zeta$ and $\psi$ within a predetermined range, a scene image can be obtained. Conversely, a point inside an area designated on the scene image can be returned to that on the camera coordinate by using equation (15).

Incidentally, transformation to the semi-scene coordinate system can be accomplished by modifying the aforementioned parameter for transformation to the complete scene coordinate system (for example, by slightly increasing the depression angle $\theta_T$). With the depression angle $\theta_T$ increased slightly, there results an image intermediate of the camera image and the image on the complete scene coordinate. In an alternative, quite a different transformation formula may be used and especially, when a wide-angle lens is used, a formula for correcting the aberration of the lens may be used.

Further, transformation from the scene coordinate system ($\zeta$-$\psi$-Z) to the map coordinate system (X-Y-Z) can be accomplished easily by applying coordinate rotation according to a pan angle of the image pickup unit 301. Furthermore, transformation from the map coordinate system (X-Y-Z) to the global coordinate system ($X_G$-$Y_G$-$Z_G$) can be accomplished easily by simply applying an offset of coordinate corresponding to the installation position of the image pickup unit 301. Accordingly, these map coordinate system and the global coordinate system can be included in the second and third coordinate systems used in the coordinate transformation process S7' and area decision process S8'. Especially, the map coordinate system is suitable for the case where the image pickup unit 301 can perform pan-tilt control and the global coordinate system is suitable for a system in which a plurality of image pickup unit s having monitor target areas (picture angles) which partly overlap are used and an intruder is purchased with the plural image pickup unit s.

As described above, the monitor system according to the present example comprises the image pickup unit 301 for picking up a monitor target area, the object detection unit 302 for processing an image picked up by the image pickup unit 301 to extract an object (image of the object) in the monitor target area and for deciding whether the extracted object is an object to be detected, on the basis of information of the object to be detected, to detect the object in the monitor target area, the display unit 303 for displaying an image based on the result of object detection by the object detection unit 302 and the setting unit 304 for setting various kinds of parameters adjustable by an operator, whereby the object to be detected which is present in the monitor target area can be detected.

Specifically, in the present example, the coordinate system (first coordinate system) of an input image obtained by the image pickup unit 301 is transformed to different coordinate systems (second and third coordinate systems) on the basis of at least three parameters of image pickup unit 301 represented by its installation height, its depression angle looking down from the installation height and its view field angle.

Here, the second coordinate system (complete scene coordinate system) is, for example, a coordinate system analogous to a coordinate system on an actual map of the monitor target area and is suitable to deciding the position of the extracted object.

The third coordinate system (semi-scene coordinate system) is, for example, a coordinate system capable of enabling the apparent height of an object in the monitor target area to be viewed independently of the distance as far as possible and is suitable for deciding the height of the extracted object.

Structurally, the monitor system according to the present example can then cause the operator to set arbitrary the camera parameters for transformation of the first coordinate system into the second and third coordinate systems. Especially, since the operator can adjust these parameters while watching a display image subject to the coordinate transformation, the operator can be supported to facilitate visually making a decision as to whether the parameters are reasonable.

In the present example, the mode of the image processing for object detection is executed with the camera coordinate system maintained but when the operator wants to monitor an image after transformation, images by the image pickup unit are all transformed to those on the second or third coordinate system (for example, scene coordinate system and then the image processing and object detection may be carried out.

Figure 9:
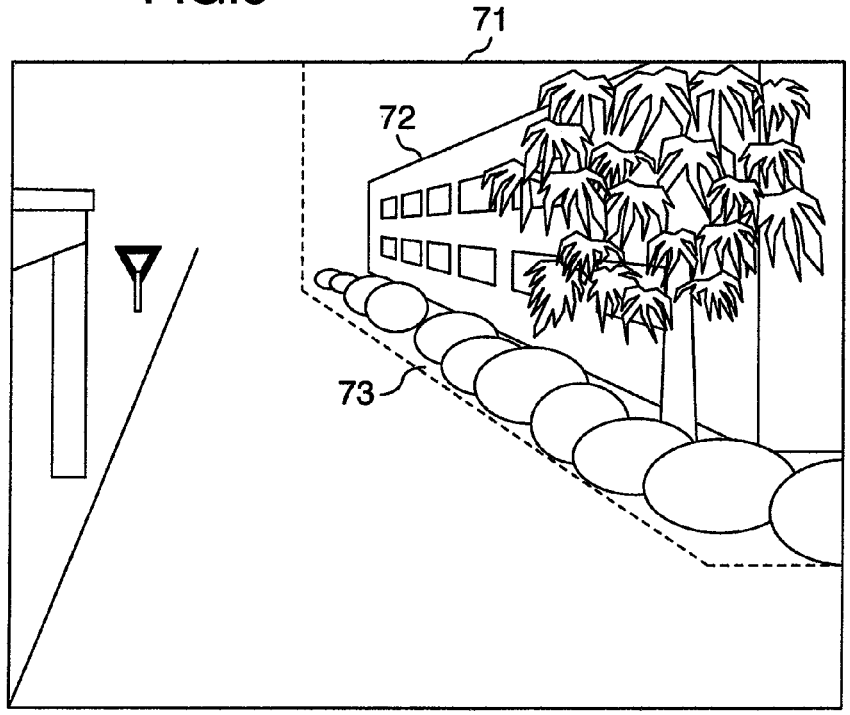
FIG. 9 is a pictorial view illustrating another example of an image (input image) picked up by the image pickup unit and another example of area setting.

Further, in the present example, the mode of setting the information such as threshold for object detection (area parameter T2 and size parameter T3) on the second or third coordinate system is employed but when, in setting the area three-dimensionally as shown in FIG. 9, the contour line of the area is rather deformed on the second or third coordinate system, setting may be waged with the camera coordinate system maintained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus for processing images picked up by a camera to detect objects in the images, comprising:
a memory for storing image data corresponding to the images picked up by the camera;
an image processor for processing said image data stored in said memory and detecting an object in said processed image data;
a display for displaying processed image data including the detected object output by said image processor; and
a designation unit for receiving setting information including coordinate transformation parameters and area parameters input by a user as a polygon or a circle defining an area in which a detected object is to be indicated to a user,
wherein said image processor transforms an image on a first coordinate system representing a coordinate system during pickup to an image on a second coordinate system set up on a plane representing a reference based on the coordinate transformation parameters, said display displaying the transformed image,
wherein said designation unit receives said polygon or the circle input by the user on the transformed image being displayed in the screen,
wherein said image processor transforms the picked-up image or/and the area parameters by using the coordinate transformation parameters and then detects an object inside the area defined by the area parameters for indicating to the user, and
wherein said second coordinate system is an approximation of an orthonormal coordinate system having two axes on a ground surface plane so that said image on the second coordinate system corresponds to a map of a monitoring target area, said coordinate transformation parameters includes three independent parameters corresponding to a depression angle, an installation height and a view field angle of said camera, and said image processor performs mutual transformation between the first coordinate system and the second coordinate system through central projection about the center at a principal point of the camera.

2. An image processing apparatus according to claim 1, wherein said setting information has size parameters for defining a range of actual height of the object, in normal direction to be detected.

3. An image processing apparatus according to claim 2, wherein each time that an object representing a reference is detected, said area parameter is updated to set up an area surrounding the reference object and said image processor decides whether an object other than said reference object is in said area under the second coordinate system, and then the object other than said reference object is indicated to the user.

4. An image processing apparatus according to claim 2, wherein each time that an object representing a reference is detected, said image processor updates said area parameter so as to set up an area surrounding the reference object, transforms said area parameter designated on the second coordinate system to that on the first coordinate system in accordance with the position of said reference object, and decides whether an object other than said reference object in said area under said image on the first coordinate system, and then the object other than said reference object is indicated to the user.

5. An image processing apparatus according to claim 2, wherein said image processor transforms an image on the first coordinate system to an image on a third coordinate system in which an object's height in the transformed image is proportional to an actual height of the object irrespective of the distance from the camera, said designation unit receives setting information as a value on any of the first, second and third coordinate systems, and said image processor decides whether an object is in said area under the second coordinate system and then decides whether the object satisfies said size parameters under the transformed image which has been transformed into the third coordinate system.

6. An image processing apparatus according to claim 5, wherein said setting information has coordinate transformation parameters for transforming the first coordinate system to the second or third coordinate system, and said image processor performs mutual transformation between the first and third coordinate systems through central projection about the principal point using modified transformation parameters with greater depression angle than said transformation parameter.

7. An image processing method for processing images picked up by a camera to detect objects in the images, said image processing method comprising the steps of:
processing image data stored in a memory and detecting an object in the processed image data;
displaying the processed image data including the detected object on a display; and
receiving setting information including coordinate transformation parameters and area parameters input by a user as a polygon or a circle defining an area in which a detected object is to be indicated to a user,
wherein said image processing step comprises:
transforming an image on a first coordinate system representing a coordinate system during pickup to an image on a second coordinate system set up on a plane representing a reference based on the coordinate transformation parameters,
wherein said displaying displays the transformed image,
wherein said receiving receives said polygon or the circle input by the user on the transformed image being displayed in the screen,
transforming the picked-up image or/and the area parameters by using the coordinate transformation parameters and then detecting an object inside the area defined by the area parameters for indicating to the user, and
wherein said second coordinate system is an approximation of an orthonormal coordinate system having two axes on a ground surface plane so that said image on the second coordinate system analogizes to a map of a monitoring target area, said coordinate transformation parameters includes independent parameters corresponding to a depression angle, an installation height and a view field angle of said camera, and said image processor performs mutual transformation between the first coordinate system and the second coordinate system through central projection about the center at a principal point of the camera.

8. An image processing method according to claim 7, wherein said setting information has size parameters for defining a range of actual height of the object in normal direction to be detected.

9. An image processing method according to claim 8, wherein each time that an object representing a reference is detected, said area parameter is updated to set up an area surrounding the reference object and said image processor decided whether an object other than said reference object is in said area under the second coordinate system, and then the object other than said reference object is indicated to the user.

10. An image processing method according to claim 8, wherein each time that an object representing a reference is detected, said image processor updates said area parameter so as to set up an area surrounding the reference object, transforms said area parameter designated on the second coordinate system to that on the first coordinate system in accordance with the position of said reference object, and decides whether an object other than said reference object in said area under said image on the first coordinate system, and then the object other than said reference object is indicated to the user.

11. An image processing method according to claim 8, wherein said image processor transforms an image on the first coordinate system to an image on a third coordinate system in which an object's height in the transformed image is proportional to an actual height of the object irrespective of the distance from the camera, said designation unit receives setting information as a value on any of the first, second and third coordinate systems, and said image processor decides whether an object is in said area under the second coordinate system and then decides whether the object satisfies said size parameters under the transformed image which has been transformed into third coordinate system.

12. An image processing method according to claim 11, wherein said setting information has coordinate transformation parameters for transforming the first coordinate system to the second or third coordinate system, and said image processor performs mutual transformation between the first and third coordination systems through central projection about the principal point using modified transformation parameters with greater depression angle than said transformation parameter.

13. A computer program, stored on a non-transitory computer readable storage medium, for processing images picked up by a camera to detect objects in the images, said computer program, when executed, causes an image processing apparatus to perform the steps of:
processing image data stored in a memory and detecting an object in the processed image data;
displaying the processed image data including the detected object on a display; and
receiving setting information including coordinate transformation parameters and area parameters input by a user as a polygon or a circle defining an area in which a detected object is to be indicated to a user,
wherein said processing step comprises:
transforming an image on a first coordinate system representing a coordinate system during pickup to an image on a second coordinate system set up on a plane representing a reference based on the coordinate transformation parameters,
wherein said displaying displays the transformed image,
wherein said receiving receives said polygon or the circle input by the user on the transformed image being displayed,
transforming the picked-up image or/and the area parameters by using the coordinate transformation parameters and then detects an object inside the area defined by the area parameters for indicating to the user, and
wherein said second coordinate system is an approximation of an orthonormal coordinate system having two axes on a ground surface plane so that said image on the second coordinate system analogizes to a map of a monitoring target area, said coordinate transformation parameters includes three independent parameters corresponding to a depression angle, an installation height and a view field angle of said camera and said image processor performs mutual transformation between the first coordinate system and the second coordinate system through central projection about the center at a principal point of the camera.

14. A computer program according to claim 13, wherein said setting image has size parameters for defining a range of actual height of the object, in normal direction to be detected.

15. A computer program according to claim 14, wherein each time that an object representing a reference is detected, said area parameter is updated to set up an area surrounding the reference object and said image processor decides whether an object other than said reference object is in said area under the second coordinate system, and then the object other than said reference object is indicated to the user.

16. A computer program according to claim 14, wherein each time that an object representing a reference is detected, said image processor updates said area parameter so as to set up an area surrounding the reference object, transforms said area parameter designated on the, second coordinate system to that on the first coordinate system in accordance with the position of said reference object, and decides whether an object other than said reference object in said area under said image on the first coordinate system, and then the object other than said reference object is indicated to the user.

17. A computer program according to claim 14, wherein said image processor transforms an image on the first coordinate system to an image on a third coordinate system in which an object's height in the transformed image is proportional to an actual height of the object irrespective of the distance from the camera, said designation unit receives setting information as a value on any of the first, second and third coordinate systems, and said image processor decides whether an object is in said area under the second coordinate system and then decides whether the object satisfies said size parameters under the transformed image which has been transformed into the third coordinate system.

18. A computer program according to claim 17, wherein said setting information has coordinate transformation parameter for transforming the first coordinate system to the second or third coordinate system, and said image processor performs mutual transformation between the first and third coordinate systems through central projection about the principal point using modified transformation parameters with greater depression angle than said transformation parameter.

19. An image processing apparatus according to claim 2, wherein said image processor, when setting information has not been received, calculates differences between a picked-up input image and a background image to obtain a difference image, compares values of respective pixels in a difference image with a predetermined threshold to perform a transformation such that pixels having values larger than the predetermined threshold are transformed to "255" and pixels having values less than the predetermined threshold are transformed to "0", to obtain a binarized image, labeling lumps each including "255" pixels in the binarized image that are allotted with different numbers to ensure that they can be processed discriminately, updates the background image using the picked-up image, preparing a new background image so that the background image can be kept to be in a latest condition, transforms position, height and width of each of the labeled lumps from those on the first coordinate system to those on the second system based on coordinate transformation parameters, performs an area decision process by referring to the area parameters and when a labeled lump having a height and width which corresponds to the size parameter is present in an area designated by the area parameters, determines the lump as being an intrusion object.

20. An image processing apparatus according to claim 3, wherein when the user defines an area including an object to be detected having a predetermined radius, the image processor provides the picked-up image an overlay display of an elliptical area centered on a position of the object to be detected, sets a label number of the object to be detected and the predetermined radius of the area as area parameters, and based on a size of the object to be detected at the time the user defines the area, sets a size parameter for the object to be detected.

* * * * *